US010293842B2

(12) United States Patent
Miyajima et al.

(10) Patent No.: US 10,293,842 B2
(45) Date of Patent: May 21, 2019

(54) ON-BOARD DEVICE, SIGNALING SYSTEM, AND CONTROL METHOD OF MOVING VEHICLE

(71) Applicant: Mitsubishi Heavy Industries Engineering, Ltd., Kanagawa (JP)

(72) Inventors: Yutaka Miyajima, Tokyo (JP); Takahiro Maruyama, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 369 days.

(21) Appl. No.: 14/780,240

(22) PCT Filed: Mar. 29, 2013

(86) PCT No.: PCT/JP2013/059735
§ 371 (c)(1),
(2) Date: Sep. 25, 2015

(87) PCT Pub. No.: WO2014/155731
PCT Pub. Date: Oct. 2, 2014

(65) Prior Publication Data
US 2016/0039438 A1 Feb. 11, 2016

(51) Int. Cl.
*B61L 27/00* (2006.01)
*B60L 15/40* (2006.01)
(Continued)

(52) U.S. Cl.
CPC ......... *B61L 27/0077* (2013.01); *B60L 3/0015* (2013.01); *B60L 3/0023* (2013.01);
(Continued)

(58) Field of Classification Search
None
See application file for complete search history.

(56) References Cited

U.S. PATENT DOCUMENTS 4,926,753 A * 5/1990 Weiss .................... B60L 15/005
 104/118
9,522,688 B2 * 12/2016 Miyajima ............... B60L 15/40
(Continued)

FOREIGN PATENT DOCUMENTS

JP 2001-347948 A 12/2001
JP 2005-178742 A 7/2005
(Continued)

OTHER PUBLICATIONS

Notice of Eligibility for Grant in SG Application No. 11201507827X, dated Mar. 15, 2016.
(Continued)

*Primary Examiner* — Kimberly S Berona
*Assistant Examiner* — Michael F Whalen
(74) *Attorney, Agent, or Firm* — Kanesaka Berner and Partners, LLP

(57) ABSTRACT

An on-board device is loaded in a moving vehicle and includes a control device configured to control the traveling of the moving vehicle. In the control device, an in-field traveling instructing section determines whether a blockade moving vehicle exists to hinder the traveling of the moving vehicle on a traveling route to an inspection field in a railyard, based on different moving vehicle related data in the railyard when the moving vehicle is an inspection waiting vehicle. A traveling route securing section requests securement of the traveling route to a railyard interface device that controls branching on the traveling route when there is not the blockade moving vehicle on the traveling route. A traveling permission section permits the traveling of the moving vehicle on the secured route based on traveling route state data from the railyard interface device.

13 Claims, 21 Drawing Sheets

(51) Int. Cl.
*B60L 3/00* (2019.01)
*B60L 3/10* (2006.01)
*B60L 3/12* (2006.01)
*B61L 23/34* (2006.01)

(52) U.S. Cl.
CPC .............. *B60L 3/102* (2013.01); *B60L 3/106* (2013.01); *B60L 3/12* (2013.01); *B60L 15/40* (2013.01); *B61L 23/34* (2013.01); *B61L 27/0027* (2013.01); *B61L 27/0094* (2013.01); B60L 2200/26 (2013.01); B60L 2240/12 (2013.01); B60L 2240/461 (2013.01); B60L 2240/465 (2013.01); B60L 2240/62 (2013.01); B60L 2240/70 (2013.01); B60L 2240/80 (2013.01); B60L 2250/16 (2013.01); *Y02T 10/7291* (2013.01); *Y02T 90/16* (2013.01); Y02T 90/162 (2013.01)

(56) References Cited

U.S. PATENT DOCUMENTS

| | | | | |
|---|---|---|---|---|
| 2002/0082814 | A1* | 6/2002 | Doner | B61L 17/00 703/6 |
| 2002/0084387 | A1* | 7/2002 | Matheson | B61L 17/00 246/124 |
| 2004/0128062 | A1* | 7/2004 | Ogino | G01C 21/26 701/400 |
| 2004/0167687 | A1* | 8/2004 | Kornick | B61L 3/127 701/19 |
| 2005/0251337 | A1* | 11/2005 | Rajaram | B61L 23/34 701/301 |
| 2006/0195236 | A1* | 8/2006 | Katsuta | B61L 11/08 701/19 |
| 2007/0145196 | A1* | 6/2007 | Davenport | B61G 7/14 246/1 C |
| 2007/0276555 | A1* | 11/2007 | Kiss | B61L 17/00 701/19 |
| 2009/0099825 | A1* | 4/2009 | Bollapragada | B61L 27/0016 703/8 |
| 2014/0032035 | A1* | 1/2014 | Thomson | G05D 1/0274 701/25 |
| 2015/0066561 | A1* | 3/2015 | Wills | G06Q 10/06313 705/7.23 |
| 2015/0232097 | A1* | 8/2015 | Luther | B61L 3/006 701/123 |

FOREIGN PATENT DOCUMENTS

| | | |
|---|---|---|
| JP | 2006-232106 A | 9/2006 |
| JP | 2007-1519 A | 1/2007 |
| JP | 2008-247215 A | 10/2008 |
| JP | 2012-86779 A | 5/2012 |
| JP | 2012-96704 A | 5/2012 |
| JP | 2012-131324 A | 7/2012 |

OTHER PUBLICATIONS

International Preliminary Report on Patentability dated Oct. 8, 2015, corresponding to International Patent Application No. PCT/JP2013/059735.

International Search Report dated Jun. 25, 2013, corresponding to International application No. PCT/JP2013/059735.

Decision to Grant a Patent in JP Application No. 2015-507910, dated Sep. 21, 2016.

* cited by examiner

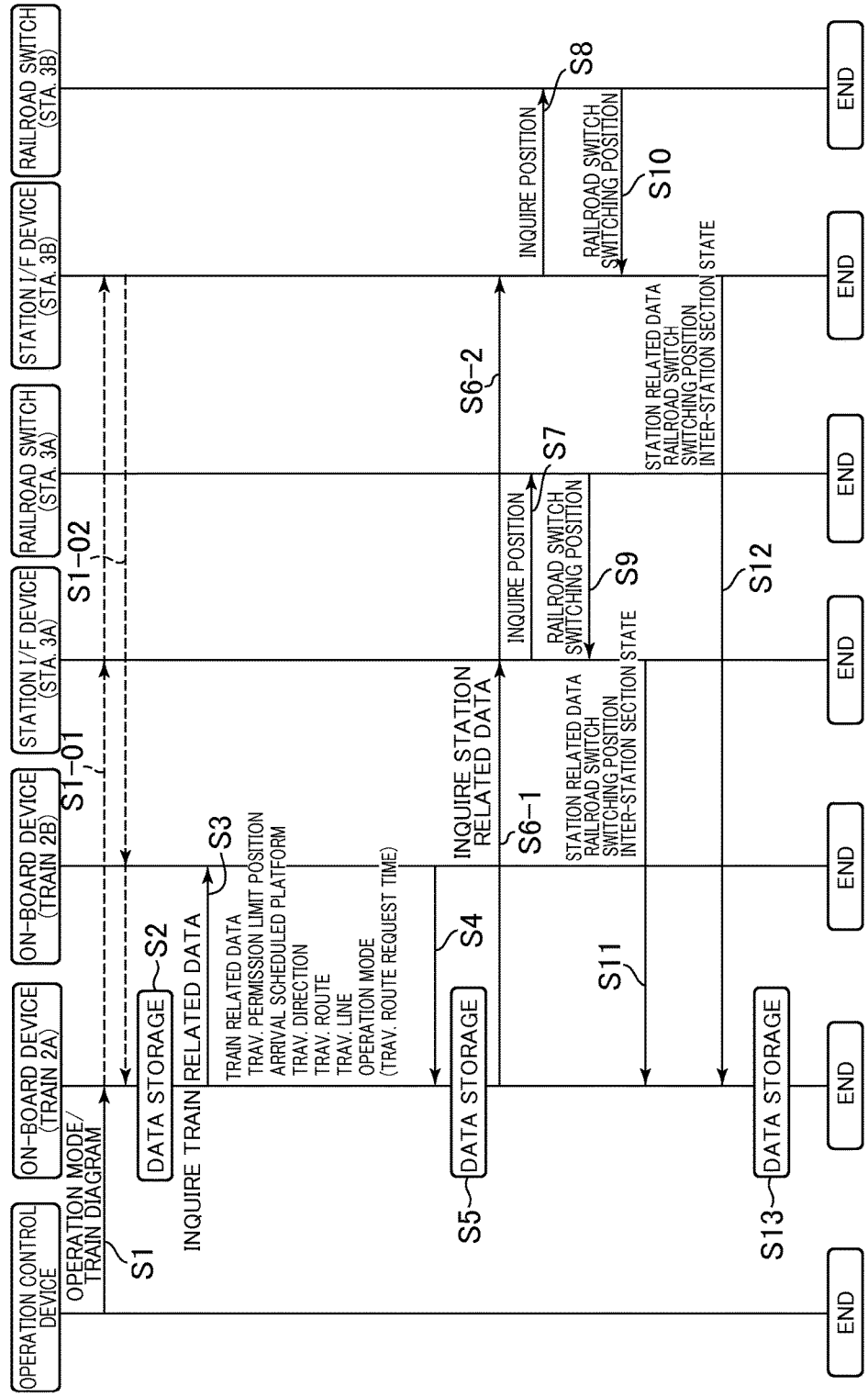

ON-BOARD DEVICE, SIGNALING SYSTEM, AND CONTROL METHOD OF MOVING VEHICLE

RELATED APPLICATIONS

The present application is a National Phase of International Application Number PCT/JP2013/059735, filed Mar. 29, 2013.

TECHNICAL FIELD

The present invention relates to an on-board device, a signaling system and a control method of a moving vehicle, and especially, to an on-board device of a vehicle moving traveling on a track, a signaling system and a control method of the moving vehicle.

BACKGROUND ART

A moving vehicle (a train) traveling on a track as in a new transportation system and a railway is known. A signaling system which controls the traveling of such a moving vehicle is known. The conventional signaling system is of a central supervisory control-type. In the central supervisory control-type signaling system, devices for a main safety function (a protection function) are concentrates in a control center, and the traveling states of trains in a whole railroad division are grasped and managed, in order to realize a function safety. The devices for the function safety (protection devices) contain an interlocking device, an ATP (Automatic Train Protection) ground device, and a station control device.

FIG. 1A is a block diagram showing a configuration of the conventional signaling system. This signaling system is divided into a control center, (a group of) trains, stations and railroad tracks. The control center grasps and manages the operation states of trains in the whole railroad division, to realize the function safety. The control center contains an operation control device 230, an ATP ground device 232, a station control device 234 and an interlocking device 236. The respective devices are mutually connected by an exclusive-use LAN (Local-Area Network) 238 to be bi-directionally communicable. The operation control device 230 controls the whole operation. The interlocking device 236 carries out the protection of traveling routes of the trains. The ATP ground device 232 prevents a collision between the trains. The station control device 234 attains the function safety of the control of opening/closing of doors of a platform screen door and train at a station.

Each of the (group of) trains is provided with an on-board device 210. The on-board device 210 controls the operation of the train under the control of the control center. The on-board device 210 is connected with the ATP ground device 232 by the exclusive-use LAN to be bi-directionally communicable. The station is provided with a remote I/O 220. The remote I/O 220 carries out the opening/closing control of the platform screen door 240 and the control of railroad switches 250 on the railroad track under the control of the control center. The remote I/O 220 is connected with the station control device 234 and the interlocking device 236 by an exclusive-use LAN to be bi-directionally communicable.

The operation of this conventional signaling system (the operation of a train) is as described below, for example.

When a departure time of an optional train gets closer based on the train diagram, the operation control device 230 refers to the on-rail state 205 from the ATP ground device 232 to check the on-rail state in the railroad division. When determining that the on-rail state indicates that the train is possible to depart, the operation control device 230 issues a departure command (or a traveling route request) 206 to the train.

When receiving the departure command (or the traveling route request) 206, the interlocking device 236 refers to the on-rail state 205 in the railroad division which is received from the ATP ground device 232 at a constant period and issues a command to the remote I/O 220 such that the railroad switches (branches) 250 in an object section for which the train travels, is coincident with the direction of a traveling route. The remote I/O 220 controls the railroad switches (branches) 250 in the object section for which the train travels, to be switched to the traveling route direction. The interlocking device 236 locks the railroad switches (branches) 250 after the switching. As a result, the traveling route of the train is exclusively established (traveling route control 201). A different train never travels on the traveling route. The interlocking device 236 outputs the state of such a traveling route to the ATP ground device 232 at a constant period as a traveling route state 207.

The ATP ground device 232 always monitors a train position by using a latest train position 204 received from detectors arranged on the railroad track and the train. The ATP ground device 232 outputs the on-rail state 205 in the railroad division, which is based on the monitoring result, to the interlocking device 236 at a constant period. Also, the ATP ground device 232 refers to the traveling route state 207 received from the interlocking device 236 at a constant period, outputs a traveling permission 202 to the train for which the traveling route is established, while considering to keep a safety distance from a preceding train. The train generates a speed profile to a traveling permission limit position when receiving the traveling permission 202, and starts to travel under the speed control to be carried out while referring to the profile.

The station control device 234 receives a train state 208 (the state in which the operation is perfectly stopped and a brake is working) through the ATP ground device 232, after the train has arrived at a station. At the same time, the station control device 234 checks a door state of a platform screen door 240 through the remote I/O 220. After it is confirmed that it is possible to open doors of the train and the platform screen door 240, the station control device 234 issues a door opening command 203 to (the on-board device 210 of) the train through the ATP ground device 232. At the same time, the station control device 234 issues a door opening command 203 to the platform screen door 240 through the remote I/O 220.

In this way, in the conventional signaling system, for example, the traveling route control is carried out by the interlocking device 236 to establish the traveling route of the train, and the train interval protection for issuing the traveling permission of the train is carried out by the ATP ground device 232. In other words, in the conventional signaling system, the traveling route control and the train interval protection are carried out by different systems.

This method is a method proved based on results but having a problem described below. For example, the method has a processing system in which the protection functions are independent from each other, as mentioned above. Therefore, the conventional signaling system has a redundant configuration. Therefore, considering the system configuration while paying attention to the safety of the signaling system, it is not possible to step out from the above configuration and there is a limit in the cost reduction.

Also, when the signaling system is introduced, the operation control device 230, the interlocking device 236, the ATP ground device 232, and the station control device 234 become necessary to control the operations of all the trains in the whole railroad division regardless of a railroad division scale and the details of the train operation. These are a minimum configuration when the signaling system is configured, and there is a limit in reduction of an introduction cost.

Especially, the operation control device 230, the ATP ground device 232, control device 234 and the interlocking device 236 control the operations of all the trains in the whole railroad division. Therefore, each device is allocated with a very large load. For this reason, each device is extremely large in size and is expensive. Therefore, a technique is demanded in which a space for the device can be reduced, an introduction cost can be reduced, and the handling is easy.

FIG. 1B is a diagram schematically showing a layout example of a main line and a railyard connected with the main line in a railroad division. In an example of FIG. 1B, the railroad tracks 260 in the railroad division includes a railroad track 260 of the main line, railroad tracks 263a (standby lines) in a standby field of the railyard and railroad tracks 263b (inspection lines) in an inspection field of the railyard. Considering the operations of the trains in the railyard, the following traveling patterns (1) to (3) of a train 271 could be generated.

(1) Traveling Between Standby Lines (263a) in Standby Field

This traveling is carried out to replace the train 271. Specifically, a train 271a on a railroad track 263a in the standby field is driven to travel to a turn-around point 281 (as a train 271b), and then driven to travel on another railroad track 263a in the standby field (as a train 271c).

(2) Traveling from Standby Field to Inspection Field

This traveling is carried out for a vehicle inspection of the train 271. Specifically, a train 271d on the railroad track 263a in the standby field is traveled to the turn-around point 281 (as the train 271b), and the train 271b is traveled to the inspection field (train 271e) and is traveled onto the railroad track 263b in the inspection field (train 271f).

(3) Traveling Between Inspection Lines (263b) in Inspection Field

This traveling is carried out to move the train 271 from an inspection line for carrying out some check (e.g. light check) to another inspection line for carrying out another check (e.g. heavy check). Specifically, the train 271f on the railroad track 263b in the inspection field is traveled to the turn-around point 282 (train 271g), and then it is traveled to another railroad track 263b in the standby field (train 271h).

When the train 271 is traveled according to such a pattern, the turn-around point 281 or 282 are previously determined, the train is once moved to the turn-around point 281, 282, the traveling direction is switched, and then the train is traveled to a destination point. In the conventional signaling system, the traveling route to the turn-around point is manually set, and after the train 271 completes the traveling to the turn-around point, a traveling route to the destination point is newly set to travel the train 271.

The above method is executed in a processing procedure described below, due to the mechanism of the signaling system.

First, a command staff selects a vehicle as a traveling object. Next, the command staff checks an on-rail state around the object vehicle. After that, the command staff sets a traveling route to the turn-around point manually by using an operation control device. Thus, the vehicle travels to the turn-around point. The command staff checks whether or not the vehicle arrives at the turn-around point. Next, the command staff checks the on-rail state around the object vehicle. After that, the command staff sets the traveling route to the destination point manually by using the operation control device. Thus, the object vehicle arrives at the destination point.

The following problems appear in this method.

The method is executed by a manual interrupt in the state that vehicles go out and enter through the replacement with the main line (railroad track 263). Therefore, the replacement with the main line is delayed as the time necessary for the replacement work becomes long, which result in the reduced transportation capacity. Also, when an object vehicle on the standby line travels to the inspection field, it is necessary to move the object vehicle after vehicles in front of the object vehicle are moved to another standby line, if the object vehicle is on the standby line behind the vehicles. It imposes a load on the command staff. A technique in which the load of a manual operation can be reduced and the railyard can be used efficiently is demanded.

As a related art, JP 2012-96704A discloses a radio train control system and a radio train control method. The radio train control system includes a central device, a station control device provided for each railroad station and connected with the central device to be communicable, an on-board device provided in each train and connected with the station control device to be radio-communicable in a radio communication area of a station and a periphery of the station. In this radio train control system, the on-board device includes transmission means for transmitting position information to the station control device. The station control device includes main operation means for receiving the position information from the on-board device, storing on-rail information showing that the train is on a rail every partitioning section, transmitting the on-rail information to the central device, receiving instruction information from the central device, and controlling devices in the station based on the instruction information. The central device includes main operation means for determining a traveling permission range of each train based on the on-rail information received from the station control device and transmitting instruction information to the station control device. Moreover, the station control device further includes advance data storing means for setting advance data showing that the train advanced into the station, to a inerasable state when cannot be normally communicated with the central device. The central device includes return means for receiving all the advance data from the station control device and returning to a main use operation from a temporary use operation after the partitioning sections where all the trains are present are determined.

Also, JP 2012-131324A discloses an operation security method and an operation security system. The operation security method is a method by the operation security system which includes 1) a control device which manages an occupation state in each closed section, 2) a railroad switch control device which controls a railroad switch, and 3) an on-board device which is loaded into a train and carries out an interlocking control of the configuration of a traveling schedule route based on each closed section and position information of the railroad switch. The method includes a securement request step in which the on-board device transmits a securement request signal to the control device to request the occupation securement of the closed sections of a traveling schedule route; an occupation securing step in which the control device carries out a determination of whether or not all of the closed sections of the traveling schedule route meet a predetermined occupation possible condition, based on the securement request signal, sets all the closed sections to occupation existence when meeting the predetermined occupation possible condition, and transmits a securement signal to the on-board device; a first switching instruction step in which the on-board device transmits a switching instruction signal to a switch control device for a switch on the traveling scheduled route when receiving the securement signal; a switching step in which the switch control device carries out the switch and lock operation to transmits a switching completion signal to the on-board device when receiving the switching instruction signal; a traveling permission step in which the on-board device permits the traveling to the traveling scheduled route when receiving the switching completion signal; a release request step in which the on-board device transmits a release request signal to request the occupation release of the closed section which the train has traveled; and an occupation release step in which the control device releases the occupation of a target closed section based on the release request signal.

CITATION LIST

[Patent literature 1] JP 2012-96704A
[Patent literature 2] JP 2012-131324A

SUMMARY OF THE INVENTION

Therefore, an object of the present invention is to provide an on-board device, a signaling system and a control method of a moving vehicle, in which a space for devices and so on can be reduced. Also, another object of the present invention is to provide an on-board device, a signaling system and a control method of a moving vehicle, in which an introduction cost can be reduced. Still another object of the present invention is to provide an on-board device, a signaling system and a control method of a moving vehicle, in which the handling of equipments is easier. Still another object of the present invention is to provide an on-board device, a signaling system, and a control method of a moving vehicle, in which the load of a manual operation is reduced and a railyard can be efficiently used.

An on-board device of the present invention is loaded in a moving vehicle traveling on a track. The on-board device includes a control device configured to control the traveling of the moving vehicle. The control device includes an in-field traveling instructing section, a traveling route securing section, and a traveling permission section. The in-field traveling instructing section is configured to determine whether or not there is a blockade moving vehicle serving to hinder the traveling of the moving vehicle on a traveling route to an inspection field in a railyard, based on different moving vehicle related data indicating data related to different moving vehicles in the railyard when the moving vehicle is in an inspection waiting state in the railyard. The traveling route securing section is configured to request securement of the traveling route to a railyard interface device that controls branching on the traveling route when there is not the blockade moving vehicle on the traveling route. The traveling permission section is configured to permit the traveling of the moving vehicle on the secured traveling route based on traveling route state data indicating the traveling route securement from the railyard interface device.

In the above-mentioned on-board device, the in-field travel instructing section outputs a traveling command to the blockade moving vehicle, when there is the blockade moving vehicle on the traveling route.

In the above-mentioned on-board device, the control device further includes an in-field leading section configured to search a traveling destination in the railyard based on the different moving vehicle related data, when receiving the traveling command as the blockade moving vehicle from a different moving vehicle, and control the blockade moving vehicle to travel to the searched traveling destination.

In the above-mentioned on-board device, the in-field leading section may determine whether or not the blockade moving vehicle is a head blockade moving vehicle, when recognizing that there are a plurality of the blockade moving vehicles, based on the different moving vehicle related data, and search the traveling destination in the railyard, when being the head blockade moving vehicle, control the blockade moving vehicle to travel to the searched traveling destination, and travel to follow a neighbor blockade moving vehicle when being not the head blockade moving vehicle.

In the above-mentioned on-board device, the control device may further include a train state setting section configured to refer to an operation state of the moving vehicle stored in the moving vehicle to determine whether or not the operation state meets a predetermined inspection condition, when the moving vehicle is in the on-line state in the railyard. When the moving vehicle meets the predetermined inspection condition, the train state setting section sets a train state to the inspection waiting state indicating that inspection should be carried out.

A signaling system of the present invention has a plurality of on-board devices, and a railyard interface device. The plurality of on-board devices are loaded in a plurality of moving vehicles traveling on a track, and each on-board device is described in any one of the above paragraphs. The railyard interface device arranged in the railyard to be communicable bi-directionally with the plurality of on-board devices and configured to control a plurality of branches in the railyard.

A control method of a moving vehicle of the present invention is a control method of a moving vehicle traveling on a track. The control method of this moving vehicle includes: determining, by an on-board device of a moving vehicle, whether or not there is a blockade moving vehicle serving to hinder the traveling of the moving vehicle on a traveling route to an inspection field in a railyard based on different moving vehicle related data indicating data related to different moving vehicles in the railyard when the moving vehicle is in an inspection waiting state in the railyard; requesting, by the on-board device, securement of the traveling route to a railyard interface device that controls branching on the traveling route when there is not the blockade moving vehicle on the traveling route; and permitting, by the on-board device, the traveling of the moving vehicle on the secured traveling route based on traveling route state data indicating the traveling route securement from the railyard interface device.

In the above-mentioned control method of the moving vehicle, the determining whether or not there is the blockade moving vehicle includes: outputting, by the on-board device, a traveling command to the blockade moving vehicle, when there is the blockade moving vehicle on the traveling route.

The above-mentioned control method of the moving vehicle may further include searching, by the on-board device, a traveling destination in the railyard based on the different moving vehicle related data, when receiving the traveling command as the blockade moving vehicle from a different moving vehicle; and controlling the blockade moving vehicle to travel to the searched traveling destination.

In the above-mentioned control method of the moving vehicle, the controlling the blockade moving vehicle to travel to the searched traveling destination may include: determining, by the on-board device, whether or not the blockade is a head blockade moving vehicle, when recognizing that there are a plurality of the blockade moving vehicles, based on the different moving vehicle related data, searching, by the on-board device, a traveling destination in the railyard, when being the head blockade moving vehicle, controlling, by the on-board device, the blockade moving vehicle to travel to the searched traveling destination, and traveling to follow a neighbor blockade moving vehicle when being not the head blockade moving vehicle.

The above-mentioned control method of the moving vehicle may further include: referring to the operation state of the moving vehicle stored in the moving vehicle by the on-board device when the moving vehicle is in the on-line state in the railyard, and determining whether or not the operation state meets a predetermined inspection condition. The determining by the on-board device whether or not the operation state meets the predetermined inspection condition may include: setting a train state to the inspection waiting state showing that the inspection should be carried out, when the moving vehicle meets the predetermined inspection condition.

A non-transitory storage medium stores a program, when being executed, to make a computer execute the control method of the moving vehicle described in any one of the above paragraphs.

According to the present invention, the space for devices and so on can be reduced. Also, according to the present invention, the reduction of the introduction cost becomes possible. Moreover, according to the present invention, the handling of equipment becomes easy.

BRIEF DESCRIPTION OF THE DRAWINGS

The object and other objects, advantages and features of the present invention could be understood in detail from the description of the following embodiments (examples), with reference to the drawings.

FIG. 8 is s flow chart showing an operation when the on-board device of the train exchanges information with different devices.

DESCRIPTION OF EMBODIMENTS

Hereinafter, a signaling system according to embodiments of the present invention will be described with reference to the attached drawings.

In this signaling system, a protection function, which is achieved by a protection device (of an interlocking device, an ATP ground device, and a station control device) in the conventional signaling system, is provided in an on-board device of a moving vehicle (a train) in a different configuration. As a result, the on-board device determines traveling route securement autonomously and determines a traveling route (establishing a traveling route autonomously and permitting the traveling autonomously), and the train interval protection can be autonomously carried out. Thus, the reduction of a device load in a control center, the reduction of a device space, the reduction of an introduction cost, and the easy handling of devices are realized. Hereinafter, the respective embodiments will be described in detail.

First Embodiment

1. Configuration

Figure 2:
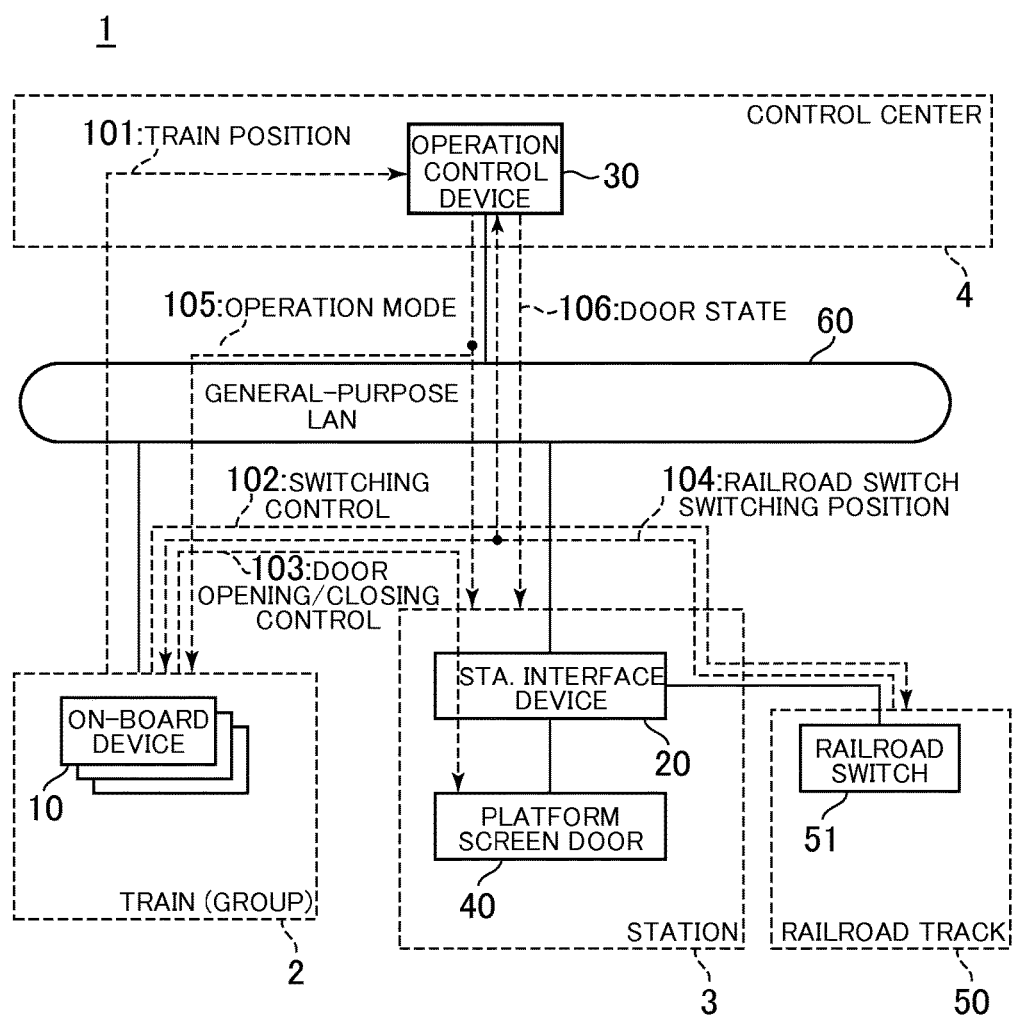
FIG. 2 is a block diagram showing the configuration of a signaling system according to a first embodiment.

The configuration of the signaling system according to a first embodiment of the present invention will be described. FIG. 2 is a block diagram showing the configuration of the signaling system according to the present embodiment. The signaling system 1 is divided into sections of a control center 4, (a group of) trains 2, stations 3 and railroad tracks 50.

Figure 1A:
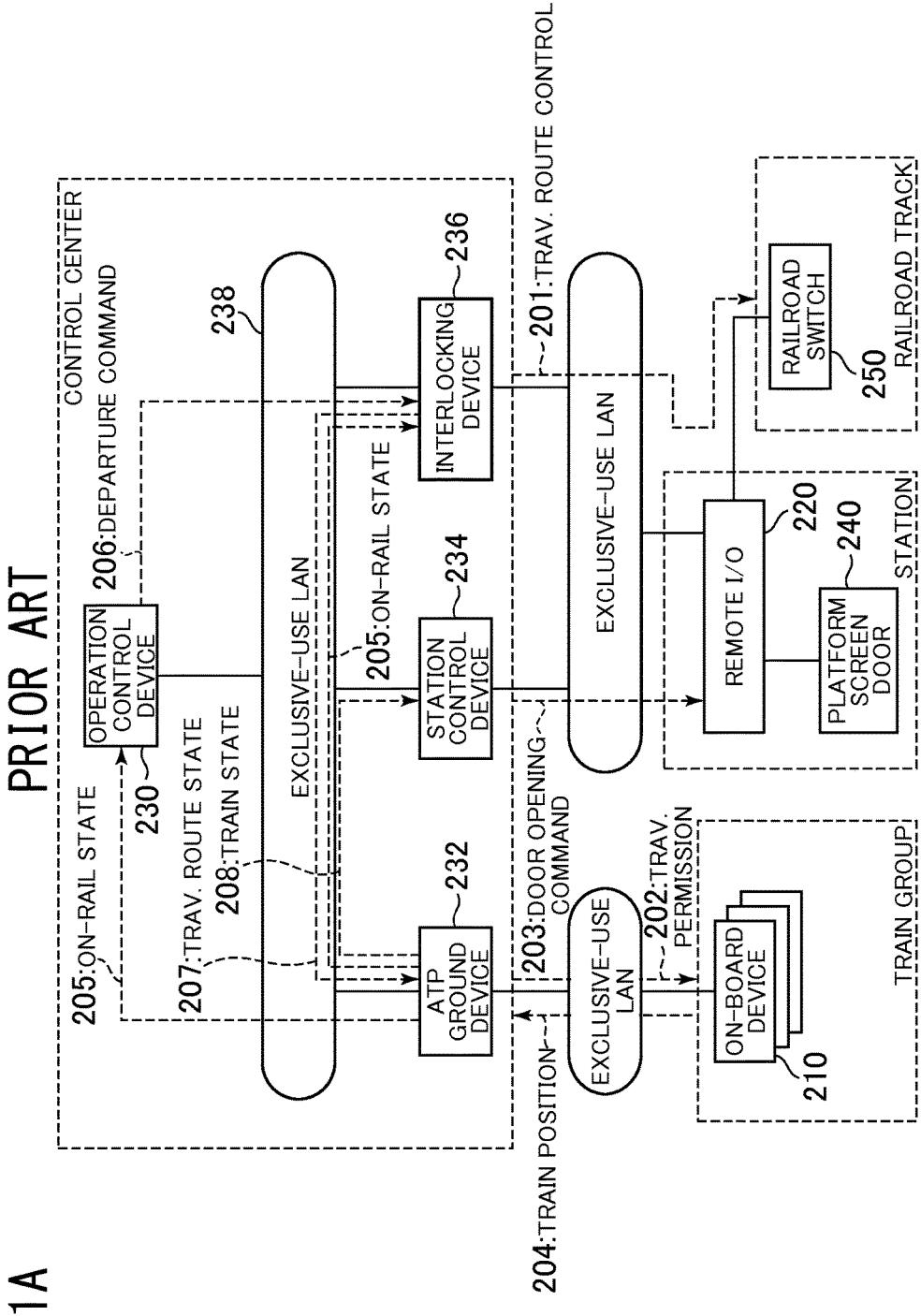
FIG. 1A is a block diagram showing the configuration of a conventional signaling system.
Figure 1B:
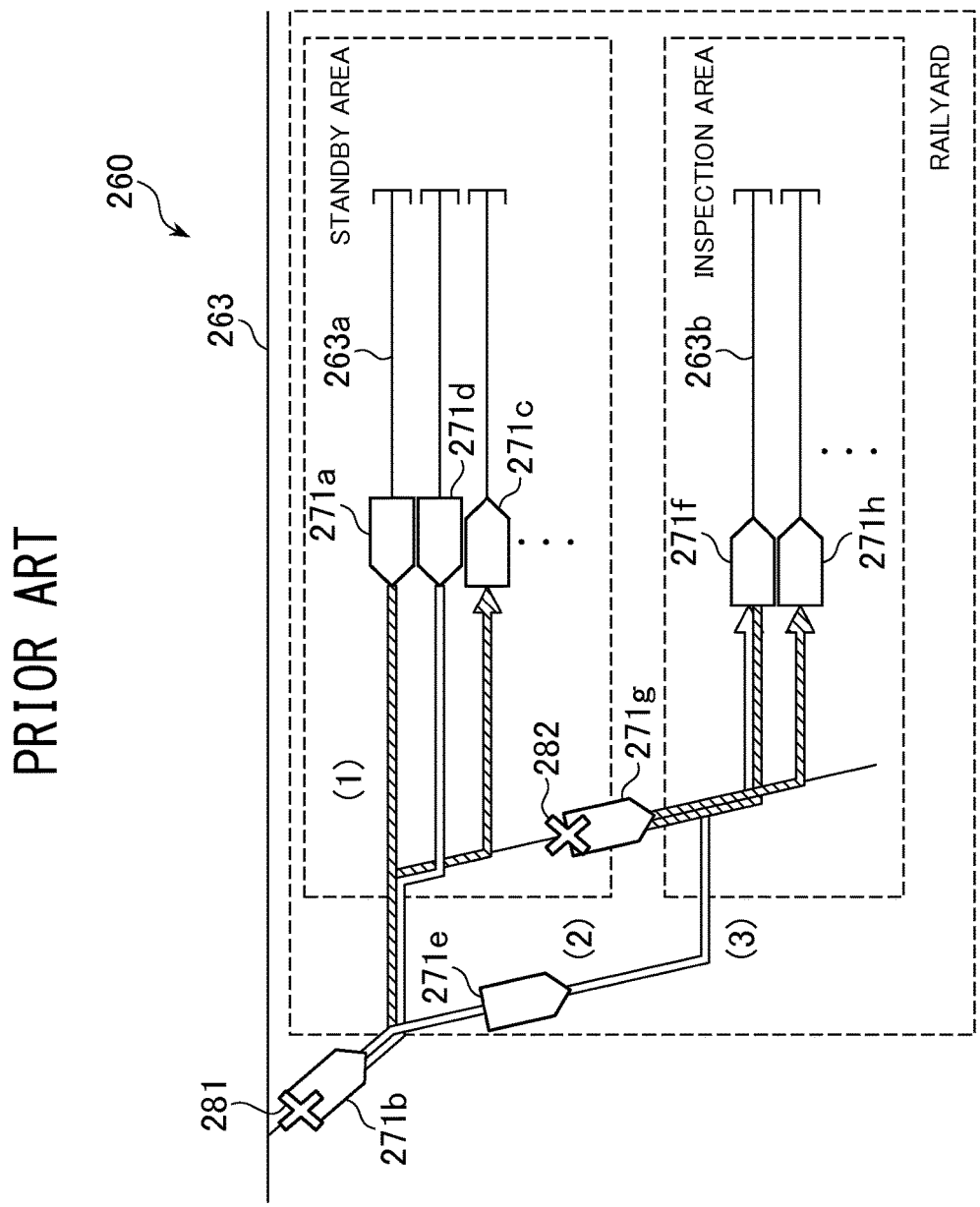
FIG. 1B is a diagram schematically showing a main line in the railroad division and an example of a layout of a railyard connected with the main line.

The control center 4 grasps an operation state of the trains 2 in the whole of railroad divisions. The control center 4 is provided with an operation control device 30. The operation control device 30 is connected with (on-board devices 10 of) the trains 2 and (station interface devices 20 of) the stations 3 through a general-purpose LAN 60 to be communicable bi-directionally. The operation control device 30 receives data of the trains 2 (e.g. train positions 101) from the trains 2, receives data of the doors of platform screen doors and trains and railroad switches (e.g. door states 106, and railroad switch switching positions 104) from the stations 3, and displays them on a display unit (not shown). Also, the operation control device 30 sets an operation mode 105 and a train diagram of the train 2, and transmits them to the trains 2 and the stations 3. The operation mode 105 is exemplified by a normal mode in which a usual operation is carried out, and a failure mode in which a failure has occurred on a track. Any devices which have functions of the operation control device 230, the ATP ground device 232, the station control device 234, and the interlocking device 236, which are shown in FIG. 1A, are not arranged in the control center 4.

There are a plurality of trains 2. Each train 2 grasps an operation state of each of neighbor trains 2, manages its own operation, and realizes a function safety. The train 2 is provided with the on-board device 10. The on-board device 10 is connected with (a station I/F device 20 of) each of the stations 3 through the general-purpose LAN 60 to be communicable bi-directionally. The on-board device 10 checks through the station 3, a railroad switch switching position 104 indicating a switching position of each of railroad switches, and controls the protection of a traveling route of the train 2 by carrying out a switching control 102 to switch the railroad switches according to necessity. Moreover, the on-board device 10 controls the collision prevention with a preceding train or a succeeding train by communicating with the preceding and succeeding trains 2. Moreover, the on-board device 10 carries out a door opening/closing control 103 to open or close the doors of the train and platform screen door in the station 3, to attain a function safety of the doors of the train and platform screen door. In this way, the on-board device 10 is provided with the protection function that has been attained by the protection device (of the interlocking device, the ATP ground device, and the station control device) in the conventional signaling system, in a different form. Therefore, the interlocking device, the ATP ground device, and the station control device can be removed from the devices of the control center 4.

There are a plurality of stations 3. Each of the stations 3 carries out the opening/closing of the platform screen door 40 and the switching of the railroad switches 51 on the railroad track 50. The station 3 is provided with the station I/F device (station interface device) 20. The station I/F device 20 controls the opening/closing of the platform screen door 40 based on the control of the on-board device 10. Moreover, the station I/F device 20 controls the switching of the plurality of railroad switches 51 on the railroad track 50 on the inbound side and the outbound side in the neighborhood of the station 3 based on the control of the on-board device 10. Moreover, the station I/F device 20 manages a switching request to the railroad switches 51 from each train 2. When the requests compete, the station I/F device 20 does not accept the later switching request.

Figure 3:
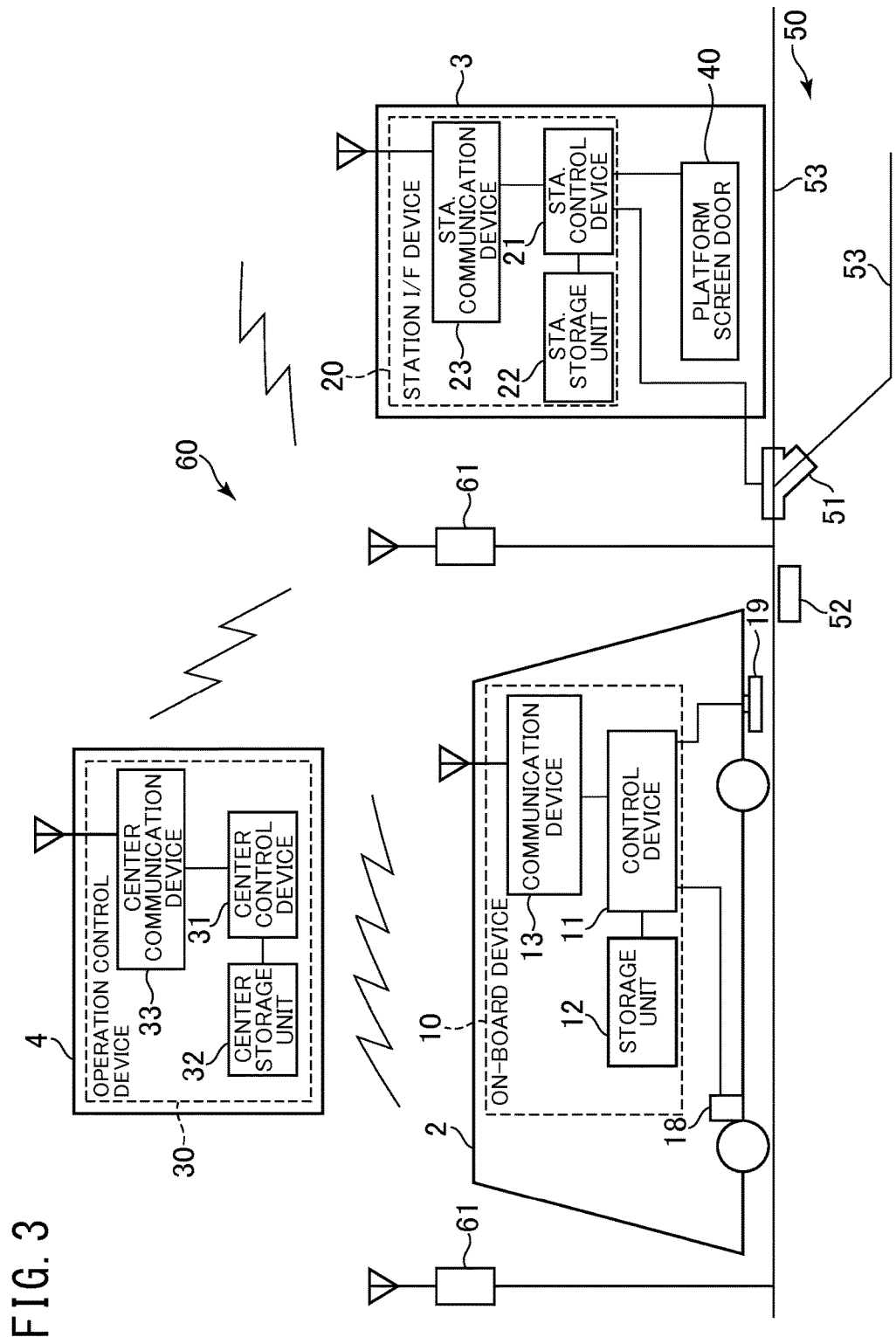
FIG. 3 is a block diagram showing a configuration example of the signaling system according to the first embodiment.

FIG. 3 is a block diagram showing a configuration example of the signaling system according to the present embodiment. The operation control device 30 of the control center 4 is provided with a center control device 31, a center storage unit 32 and a center communication device 33. The center control device 31 is an information processing unit which is exemplified by a computer, and is provided with a CPU (Central Processing Unit), a storage section, an input section, an output section and an interface, which are not shown. The center control device 31 executes information processing for the operation control device 30. The center storage unit 32 is a storage unit which is exemplified by a hard disk drive, RAM (Random Access Memory) and ROM (Read Only Memory), and stores data and a software program which are used in the center control device 31, and data and a software program which are outputted from the center control device 31. The center communication device 33 is a radio LAN transmitting and receiving unit which carries out a data communication through the general-purpose LAN 60. The center communication device 33 transmits data and the software program which are outputted from the center control device 31, to the on-board device 10 and the station I/F device 20, and receives data and the software program which are transmitted from the on-board device 10 and the station I/F device 20 to output to the center control device 31.

The general-purpose LAN 60 is provided with a plurality of base stations 61. The plurality of base stations 61 are arranged in the control center 4 and each station 3, and at a plurality of locations along the railroad track 50. The base station 61 mediates a radio communication among the operation control device 30, the plurality of the on-board devices 10 and the plurality of the station I/F devices 20 to allow data to be sent and received among them. Note that in the present embodiment, an example using the radio LAN as the communication means is shown. However, different communication means may be used if it is possible to send and receive data among them.

The on-board device 10 of the train 2 is provided with a control device 11, a storage unit 12 and a communication device 13. The control device 11 is an information processing device which is exemplified by a computer, and is provided with a CPU, a storage section, an input section, an output section and an interface, which are not shown. The control device 11 executes information processing for the on-board device 10. The storage unit 12 is a storage which is exemplified by a hard disk drive, RAM and the ROM, and stores data and a software program which are used in the control device 11, and data and a software program which are outputted from the control device 11. The communication device 13 is a radio LAN transmitting and receiving unit which carries out a data communication through the general-purpose LAN 60. The communication device 13 transmits the data and the software program which are outputted from the control device 11, to the on-board device 10 of the operation control device 30, and other trains 2, the station I/F devices 20, and receives the data and the software program which are transmitted from the on-board device 10 of the operation control device 30, the other trains 2 and the station I/F devices 20 to output to the control device 11.

Moreover, the train 2 is provided with a rotation count sensor 18 and a receiver 19. The rotation count sensor 18 detects the number of rotations of a wheel and a time change of them to output to the control device 11. The control device 11 calculates a position and speed of the train 2 based on the number of rotations and the time change of it. However, because the calculation of the position is carried out by integrating the number of rotations of the wheel, there is a possibility that an error comes out to an extent in case of a long-range integration due to the influences such as slip and tire abrasion. Therefore, a track antenna beacon (a transponder) 52 is installed in the railroad track 50 at a predetermined interval and the position is corrected every time the data of the track antenna beacon 52 is received, to prevent the accumulation of the error.

The station I/F device 20 of the station 3 is provided with a station control device 21, a station storage unit 22 and a station communication device 23. The station control device 21 is an information processing unit which is exemplified by a computer, and is provided with a CPU, a storage section, an input section, an output section and an interface, which are not shown. The station I/F device 20 executes information processing for the station I/F device 20. The station storage unit 22 is a storage unit which is exemplified by a hard disk drive, RAM and ROM, and stores data and a software program which are used in the station control device 21, and data and a software program which are outputted from the station control device 21. The station communication device 23 is a radio LAN transmitting and receiving unit which carries out a data communication through the general-purpose LAN 60, transmits the data and the software program which are outputted from the station control device 21, to the operation control device 30, the on-board devices 10 and the station I/F devices 20 of the other stations 3, and receives the data and the software program, which are transmitted from the operation control device 30, the on-board devices 10 and the station I/F devices 20 of the other stations 3, to output to the station control device 21.

Moreover, the station 3 is provided with the platform screen door 40. The station control device 21 detects a state of the platform screen door 40 and controls the opening/closing of the doors of the platform screen door 40. Moreover, the station control device 21 is connected with the plurality of railroad switches 51 (a plurality of branches) on the railroad track 50, which are arranged in the neighborhood of the station 3. The railroad switch 51 is a branch of the railroad track 53. The station control device 21 detects the state of each of the plurality of railroad switches 51 and controls the switching of each of the plurality of railroad switches 51.

Figure 4A:
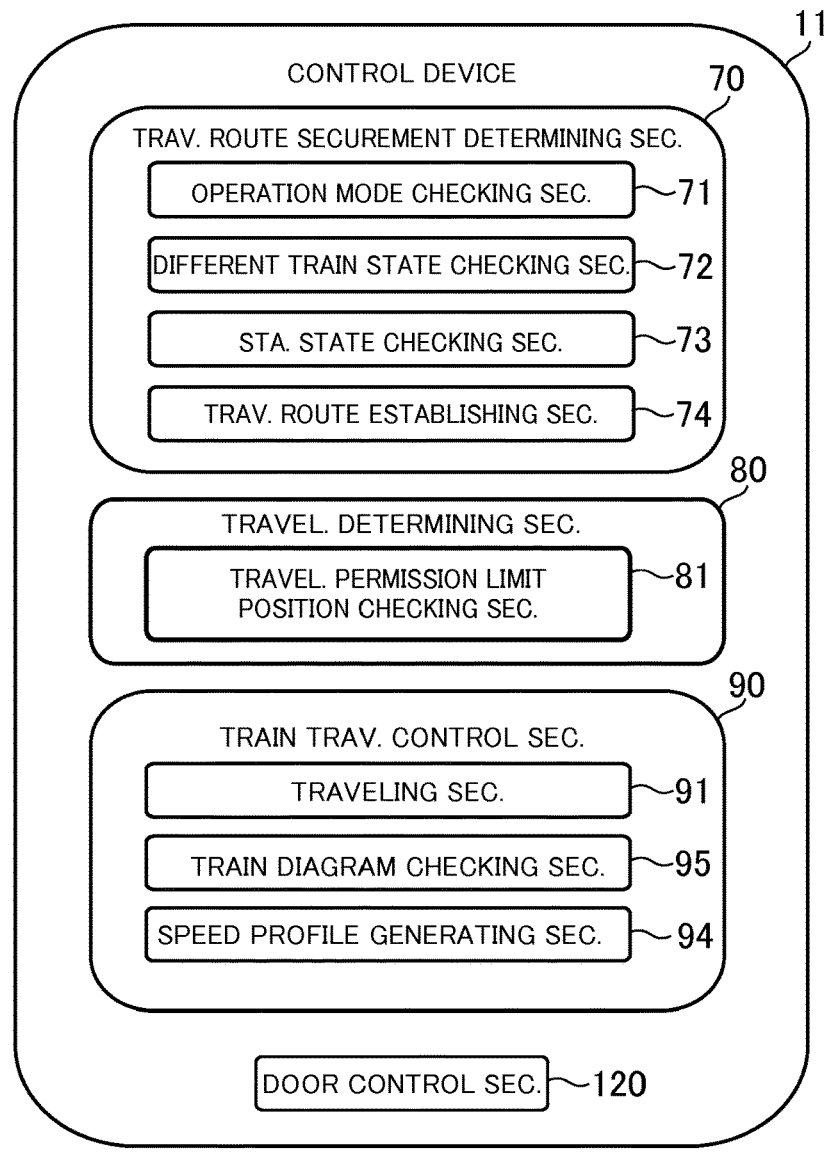
FIG. 4A is a block diagram showing a configuration example of a control device of an on-board device in the signaling system according to the first embodiment.

Next, the control device of the on-board device 10 will be more described. FIG. 4A is a block diagram showing a configuration example of the control device of the signaling system according to the present embodiment. In the control device, for example, the CPU develops in RAM (Random Access Memory), a computer program installed in the hard disk drive through an interface from a recording medium. Then, the CPU executes the developed computer program, and realizes information processing of the computer program while controlling a hardware configuration such as the storage section, the input section, the output section, the interface, the storage unit 12 and the communication device 13 according to necessity. The storage section and the storage unit 12 record the computer program and record the data used by the CPU and the generated data. The input section outputs the data generated through operation by the user and another device to the CPU and the storage section. The output section outputs the data generated by the CPU and the data stored in the storage section to the user and the other apparatus to be recognizable.

The control device 11 grasps the operation states of neighbor trains 2, manages its own operation and carries out a control for realizing a function safety. The control device 11 is provided with a traveling route securement determining section 70, a traveling determining section 80, a train traveling control section 90 and a door control section 120. The traveling route securement determining section 70, the traveling determining section 80, the train traveling control section 90 and the door control section 120 are realized by the computer program, or by cooperation between the computer program and the hardware configuration.

The traveling route securement determining section 70 carries out a control for the protection of a traveling route of the train 2 itself. That is, the traveling route securement determining section 70 checks the securement of the traveling route based on station related data (to be described later) and different train related data (to be described later). Specifically, the traveling route securement determining section 70 checks the railroad switch switching position showing the switching position of each of the railroad switches 51 through the station 3, and carries out the switching control to switch each railroad switch 51 according to necessity. The traveling route securement determining section 70 is provided with an operation mode checking section 71, a different train state checking section 72, a station state checking section 73 and a traveling route establishing section 74. The operation mode checking section 71 checks the operation mode. The different train state checking section 72 acquires the different train related data and checks the state of each of different trains 2. The station state checking section 73 acquires the station related data and checks the state of each of the stations (e.g. the switching position of each of the railroad switches 51 (a branch state)). The traveling route establishing section 74 switches the switching position of the railroad switch 51 according to necessity and establishes (secures) the traveling route for the train 2.

The traveling determining section 80 carries out a control for the collision prevention among the trains 2. That is, the traveling determining section 80 checks the traveling of the moving vehicle on the traveling route which was secured based on the different moving vehicle related data. Specifically, the traveling determining section 80 communicates with the neighbor train 2 and grasps a range where the train 2 itself is permitted to pass or travel, and permits the traveling of the train 2 in the permitted range (determines the traveling of the train 2 itself). The traveling determining section 80 is provided with a traveling permission limit position checking section 81. The traveling permission limit position checking section 81 checks a traveling permission limit position of the train 2. Here, the traveling permission limit position shows a limit position where the traveling (moving) is permitted to the targeted train 2 (e.g. distance from a reference point, or distance to a preceding train).

The train traveling control section 90 carries out a control of the train 2 to move (travel) based on a train diagram of the train 2, a position of the train 2, and the traveling permission limitation position. The train traveling control section 90 is provided with a traveling section 91, a speed profile generating section 94 and a train diagram checking section 95. The traveling section 91 drives the train 2 to travel. The train diagram checking section 95 checks the train diagram of the train 2 and issues a departure command at a departure time. The speed profile generating section 94 generates a speed limit profile showing an upper limit value of speed when traveling from a current station at which the train 2 is in a stop state to a next stop station, based on a distance from the targeted train 2 to the traveling permission limitation position.

The door control section 120 carries out a control for the function safety of the doors of the train 2 and platform screen door by controlling the opening/closing of the doors of the train 2 and platform screen door 40 in the station 3.

Figure 4B:
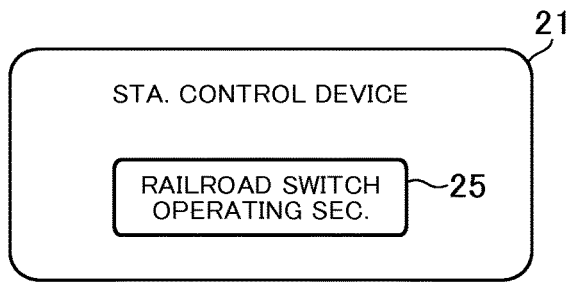
FIG. 4B is a block diagram showing a configuration example of the station control device of the station I/F device in the signaling system according to the first embodiment.

Next, the station control device 21 of the station I/F device 20 will be more described. FIG. 4B is a block diagram showing a configuration example of the station control device 21 in the signaling system according to the present embodiment. In the station control device 21, for example, the CPU develops the computer program installed in the hard disk drive through an interface from a storage medium, in the RAM. Then, the CPU execute the developed computer program, and realizes information processing of the computer program while controlling a hardware configuration such as a storage section, an input section, an output section, an interface, the station storage unit 22, and the station communication device 23 according to necessity. The storage section and the storage unit 12 record the computer program and record data used by the CPU and the generated data. The input section outputs the data generated through the operation by the user and the other device to the CPU and the storage section. The output section outputs the data generated by the CPU and the data of the storage section to the user and the other devices to be recognizable.

The station control device 21 controls the opening/closing of the platform screen door 40 and the switching of each railroad switch 51 on the railroad track 50. The station control device 21 is provided with a railroad switch operating section 25. The railroad switch operating section 25 is realized by the computer program or the cooperation between the computer program and the hardware configuration.

The railroad switch operating section 25 outputs the railroad switch switching position data showing a switching position of each of the railroad switches 51 in response to an inquiry of the station related data from the train 2. Also, the railroad switch operating section 25 determines whether or not the switching of the railroad switch 51 is possible, in response to a railroad switch switching command from the train. When the railroad switch 51 has been locked in response to the railroad switch switching command from a different train 2, the railroad switch operating section 25 refuses the switching of the railroad switch 51. When the railroad switch 51 has not been locked, the railroad switch operating section 25 carries out the switching of the railroad switch 51 and retains the railroad switch switching command as a part of the railroad switch switching position data (stores in the station storage unit 22). While the railroad switch switching command is retained, the switching state of the railroad switch 51 is maintained (locked). In this case, the railroad switch operating section 25 erases the railroad switch switching command based on a railroad switch release command from a transmission source side train 2. Thus, the lock state of the railroad switch 51 is released (cancelled). The station control device 21 of the station I/F device 20 grasps whether or not there is a failure on the traveling route to the other station 3 which is neighbor to the station 3, based on an input from a user and a notice from the station I/F device 20 of the other station 3.

Next, the main data which are stored in the storage unit 12, the station storage unit 22 and the center storage unit 32 will be described.

Figure 5A:
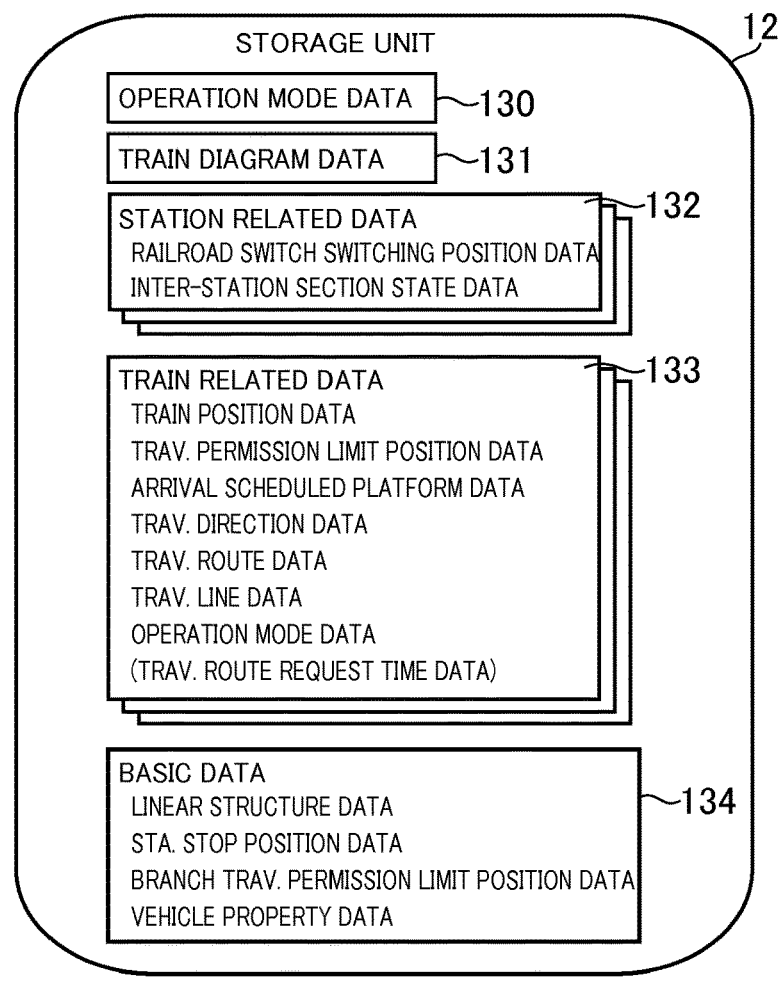
FIG. 5A is a block diagram showing the configuration of a storage unit of the on-board device in the signaling system according to the first embodiment.

FIG. 5A is a block diagram showing the configuration of the storage unit 12 of the on-board device 10 in the signaling system according to the present embodiment. The storage unit 12 contains operation mode data 130, train diagram data 131, station related data 132, train related data 133 and basic data 134 at least.

The operation mode data 130 contains data showing in what mode the train 2 travels. The operation mode data 130 is exemplified by the normal mode showing a usual operation and the failure mode showing a case where a failure has occurred on the track (it is the same as the operation mode 105 of FIG. 2). The operation mode data 130 is supplied from the operation control device 30 and is same for all the trains 2 on a railroad line.

The train diagram data 131 contains data showing the train diagram of the train 2. The train diagram data 131 is different for every train 2 and is supplied from the operation control device 30. However, the train diagram data 131 may contain only the train diagram of the train 2 and the neighbor train 2. Or, the train diagram data may be data of an operation interval.

When the train 2 is in a stop state, the station related data 132 contains data related to a current station (hereinafter, to be referred to as the station 3A) at which the train 2 is in the stop state, data related to the next station as the station 3 (hereinafter, to be referred to as the station 3B) for the train to be stopped next, data related to a previous station as the station 3 (hereinafter, to be referred to as the station 3C) for the train to have been stopped last time. When the train 2 is traveling, the station related data 132 contains data related to the previous station as the station 3 for the train 2 to have departed and data related to the next station as the station 3. The station related data 132 is updated appropriately (e.g. regularly) and is different for every train 2. The station related data 132 contains railroad switch switching position data and inter-station section state data. The railroad switch switching position data shows a switching position of each of the plurality of railroad switches 51 which belongs to the targeted stations 3A, 3B and 3C (the previous station, the current station, the next station), and contains the railroad switch command data (to be described later) of each railroad switch 51. Moreover, the railroad switch switching position data may contain the locked state or the unlocked state of the railroad switch 51. The inter-station section state data shows whether or not there is a failure in an inter-station section among the targeted stations 3A, 3B and 3C (e.g. between the station 3A and the station 3B, between the station 3A and the station 3C), and whether or not a different train is not in the on-rail state between the stations (the on-rail clearance between the stations).

The train related data 133 contains data showing the moving (traveling) of the train 2 (hereinafter, to be referred to as the train 2A) and a different train 2 (hereinafter, to be referred to as the train 2B) around the train 2A and related to the traveling. The train related data 133 is updated appropriately (e.g. regularly) and is different for every train 2. The train related data 133 contains train position data, traveling permission limit position data, arrival scheduled platform data, traveling direction data, traveling route data and traveling line data. The train position data shows a position (e.g. a distance from a reference point) of each of targeted trains 2 (the train 2A and the train 2B). The reference point is exemplified by a stop position in a starting station and a position of a track antenna beacon provided on the railroad track. The traveling permission limit position data shows a limit position for the targeted train 2 to be permitted to travel (move) (e.g. a distance from the reference point, a distance to a preceding train). The arrival scheduled platform data shows an arrival scheduled platform of the next station for the targeted train 2. The traveling direction data shows a traveling direction of the targeted train 2 (e.g. an inbound direction, an outbound direction, a branch direction). The traveling route data shows a traveling route of the targeted train 2. The traveling line data shows the traveling line (inbound line, outbound line) of the targeted train 2. Note that the arrival scheduled platform data, the traveling direction data, the traveling route data and the traveling line data can be called travel schedule data showing a schedule of travel of the train 2. Moreover, the train related data 133 may further contain the operation mode data and traveling route request time data. The operation mode data shows the operation mode of the targeted train 2. The traveling route request time data shows a time at which the targeted train 2 issues a traveling route request (switching request of the railroad switch 51) to the station I/F device 20.

The basic data 134 contains data of a basic configuration of the trains 2, the railroad tracks 50 and so on. The train 2 on the railroad line retains common basic data 134. Here, because the vehicle characteristic is sometimes different for every vehicle, each train 2 retains vehicle characteristic data showing the vehicle characteristic of its own vehicle. The basic data 134 contains linear structure data, station stop position data, limit position data in case of a failure (for branch), and vehicle characteristic data. The linear structure data shows the structure of the railroad track 50, and is exemplified by a position, shape and distance of a curved railroad track, a position and distance of a linear railroad track, an inclination of the railroad track, a position of a station, a branch position, existence or non-existence of double track, a position of the railyard and so on. The station stop position data shows a stop position at every station. The branch limit position data shows a traveling limit position on a branch railroad track of the railroad track 50. The vehicle characteristic data shows structure characteristic and operation characteristic of the vehicle.

Figure 5B:
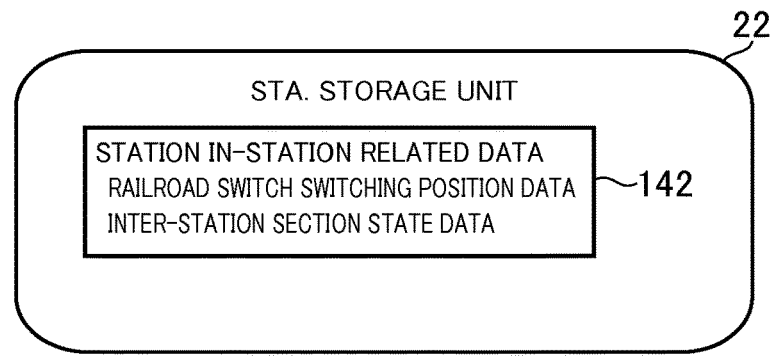
FIG. 5B is a block diagram showing the configuration of a station storage unit of the station I/F device in the signaling system according to the first embodiment.

FIG. 5B is a block diagram showing the configuration of the station I/F device 20 in the signaling system according to the present embodiment. The station storage unit 22 contains station in-station related data 142 at least.

The station in-station related data 142 contains data related to the station 3. The station in-station related data 142 is different for every station 3. The station in-station related data 142 contains the railroad switch switching position data and the inter-station section state data. The railroad switch switching position data shows a switching position of each of a plurality of railroad switches 51 which belong to the station 3, and contains railroad switch command data of each railroad switch 51. The railroad switch command data shows the railroad switch switching command from the train 2 to each of the plurality of railroad switches 51 which belong to the station 3. The railroad switch switching command is a command which instructs the switching of the railroad switch 51, and is related with data showing a command source side train 2 and is stored. While the railroad switch switching command is retained, the railroad switch 51 maintains (locks) the switching state. When the railroad switch switching command is erased in response to a railroad switch release command from the command source side train 2, the lock state of the railroad switch 51 is released. The inter-station section state data shows whether or not there is a failure between the station 3 and a neighbor station 3. The railroad switch command data and the inter-station section state data are transmitted to the on-board device 10 and the operation control device 30, and are stored as the station related data 132 and the center station related data 152.

Figure 5C:
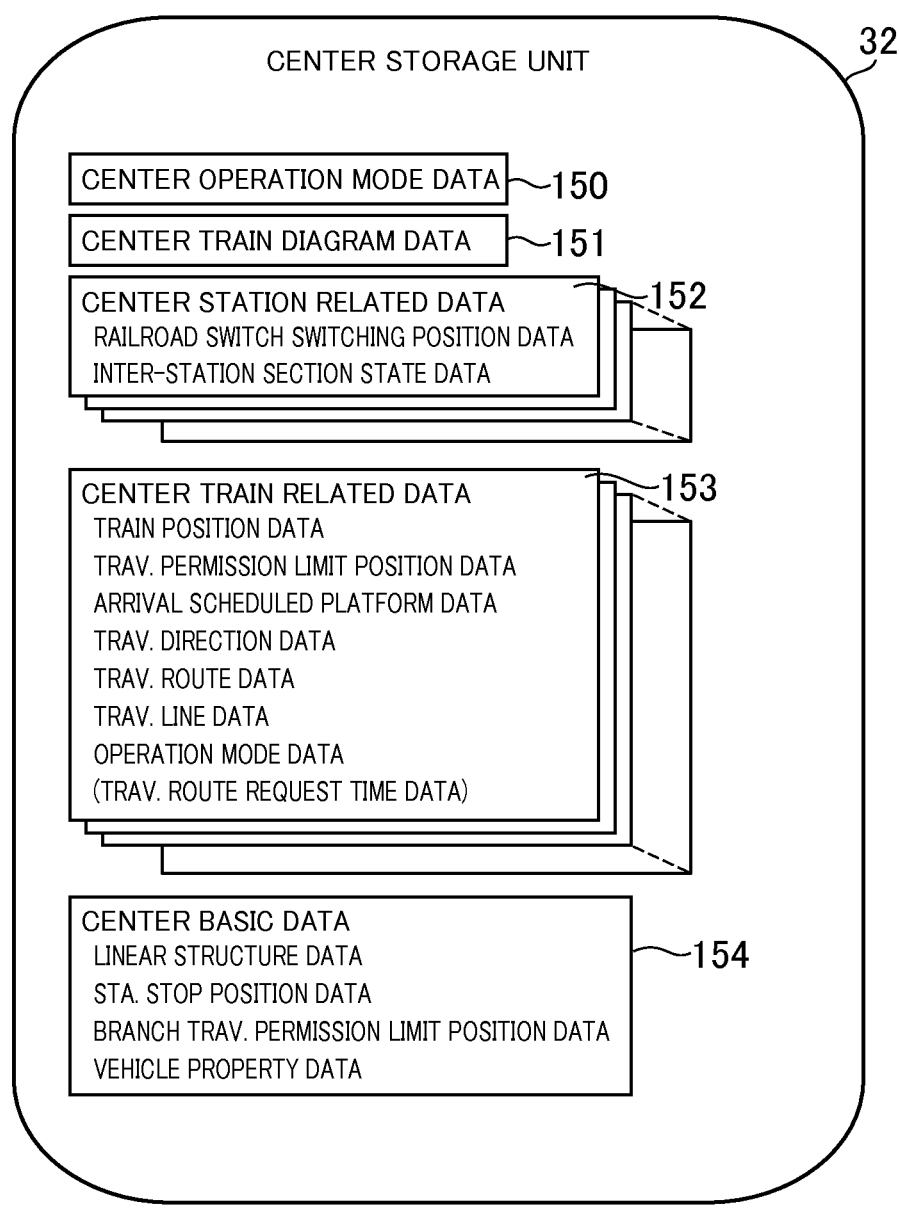
FIG. 5C is a block diagram showing the configuration of a center (CTR.) storage unit of an operation control device in the signaling system according to the first embodiment.

FIG. 5C is a block diagram showing the configuration of the center (CTR.) storage unit 32 of the operation control device 30 in the signaling system according to the present embodiment. The center storage unit 32 contains center (CTR.) operation mode data 150, center (CTR.) train diagram data 151, center (CTR.) station related data 152, center (CTR.) train related data 153 and center (CTR.) basic data 154 at least.

The center operation mode data 150 is the same as the operation mode data 130.

The center train diagram data 151 contains data showing a train diagram of a railroad line and contains the train diagrams for all the trains 2. The train diagram data may be data of the operation interval.

The center station related data 152 contains data related to all stations 3. The center station related data 152 contains the railroad switch switching position data and the inter-station section state data of the station in-station related data 142 acquired from all the stations 3. The center station related data 152 are appropriately acquired from the station I/F devices 20 of all the stations 3.

The center train related data 153 contains data related to the moving (traveling) of all the trains 2. The center train related data 153 contains the train position data, the traveling permission limit position data, the arrival scheduled platform data, traveling direction data, the traveling route data and the traveling line data of the train related data 133 acquired from all the trains 2. The center train related data 153 are appropriately acquired from the on-board devices 10 of all the trains 2.

The center basic data 154 contains data of basic structure of the train 2, the railroad track 50 and so on. The center basic data 154 is the same as the basic data 134.

2. Operation

Next, the operation of the signaling system according to the present embodiment will be described. In this case, as the operation of the signaling system, a train interval protection in case of traveling of the train 2 between the stations in the usual operation (the normal mode) will be described.

A configuration example of a railroad line to which the signaling system is applied will be described before the explanation of a specific operation.

Figure 6:
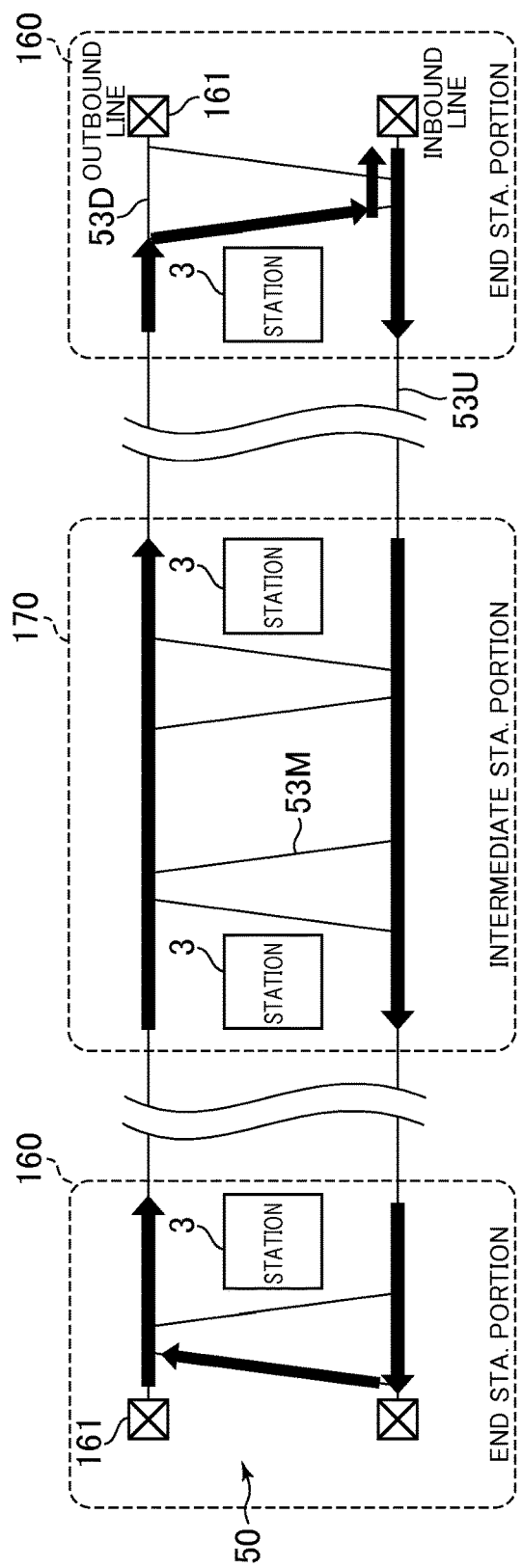
FIG. 6 is a diagram schematically showing a configuration example of a railway to which the signaling system according to the first embodiment is applied.

FIG. 6 is a schematic diagram showing a configuration example of the railroad line to which the signaling system according to the present embodiment is applied. This railroad line is provided with railroad tracks 50 and stations 3. The railroad tracks 50 are provided with a railroad track 53D, a railroad track 53U and crossovers 53M. The railroad track 53D is a railroad track of an outbound line provided between track ends 161. The railroad track 53U is a railroad track of an inbound line provided between track ends 161. The crossover 53M is a railroad track provided in the neighborhood of the station 3 to join the railroad track 53D and the railroad track 53U. A plurality of stations 3 are provided between the railroad track 53D and the railroad track 53U to have intervals. In this railroad line, an area of the station 3 which contains the track ends 161 is referred to as an end station portion 160 and an area of the station other than the end station portions 160 is referred to as an intermediate station portion 170. In the signaling system, in the intermediate station portion 170 of this traveling route, the traveling directions of the trains 2 in the inbound line 53U and the outbound line 53D are regarded to be fixed in the usual operation. Below, the operation of the signaling system in such a railroad line will be described.

Next, a scene of the train interval protection in a configuration example of the railroad line of FIG. 6 will be described.

Figure 7:
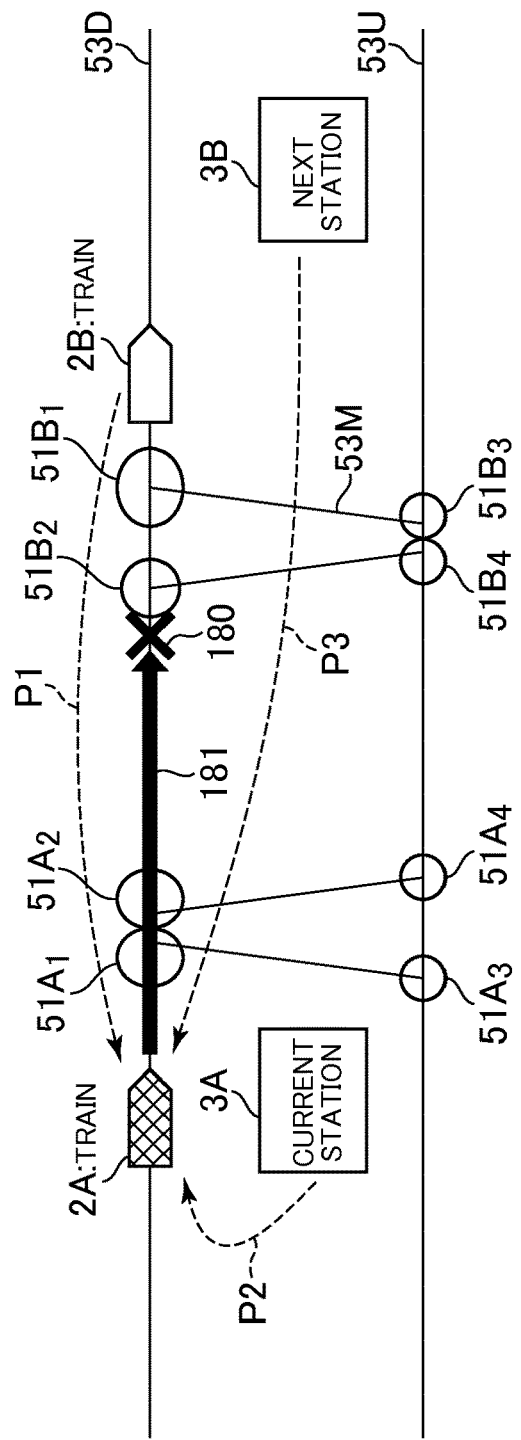
FIG. 7 is a diagram schematically showing a scene of the train interval protection in case of inter-station traveling of the train in the intermediate station portion.

FIG. 7 is a diagram schematically showing the scene of the train interval protection in an inter-station traveling of the train in the intermediate station portion 170. In FIG. 7, the attention should be paid to the train 2A which travels between the stations in the intermediate station portion 170. It is supposed that the train 2A travels on the railroad track 53D of the outbound line. The station 3 at which the train 2A has currently stopped is supposed to be a current station 3A, the station at which the train 2 stops next is supposed to be a next station 3B, the train 2 preceding to the train 2A is supposed to be a train 2B. The railroad switches 51 provided for the current station 3A are supposed to be the railroad switches 51A1 and 51A2 on the railroad track 53D from the side near the station 3A, and are supposed to be the railroad switches 51A3 and 51A4 on the railroad track 53U. The railroad switches 51 provided for the next station 3B are supposed to be the railroad switches 51B1 and 51B2 on the railroad track 53D from the side near the station 3B and are supposed to be the railroad switches 51B3 and 51B4 on the railroad track 53U.

As mentioned above, in case of the usual operation, the traveling directions of the trains 2 on the inbound line 53U and the outbound line 53D are fixed in the intermediate station portion 170. That is, the station I/F device 20 of each station 3 maintains the traveling rout between the stations 3 to constant directions, and maintains the switching positions of the railroad switches 51 in predetermined directions. The direction of the traveling route is expressed as the operation mode. In this case, it is the normal mode. The operation control device 30 notifies the operation mode to each train 2 through each station I/F device 20. The operation mode is never changed in principle if there is not the occurrence of a predetermined situation such as a failure. That is, it is presupposed that the train 2 travels on a single line (the railroad track 53D or the railroad track 53U) in the intermediate station portion 170 in the normal mode and does not cross on the railroad tracks 53 to the opposite side by using the crossover 53M. In other words, the inbound line (the railroad track 53U) and the outbound line (the railroad track 53D) are independent from each other. Therefore, in case of the normal mode, it is enough to consider only the train interval protection to the preceding train 2 on the single line in the intermediate station portion 170, for the train interval protection of the train 2. Here, the train 2 checks the passage direction of the railroad switch 51 and the inter-station section state, before traveling between the stations.

Note that when it is necessary to cross to another railroad track as in the end station portion 160 (e.g. the time of turn-around or switching the mode), the traveling route control becomes necessary. That is, a different data communication path is necessary in addition to the intervals to the preceding train 2 and the succeeding train 2. Such a case will be described in a second embodiment.

Next, a method of exchanging data between the on-board device 10 of the train 2 and a different device will be described.

FIG. 8 is a flow chart showing the operation when the on-board device of the train and the different device exchange data. The on-board device 10 of the train 2 exchange data with the different device (a plurality of different on-board devices 10, a plurality of station I/F devices 20, and the operation control device 30) according to necessity, or regularly. In this case, the attention should be paid to the on-board device 10 of the train 2A in FIG. 7.

The operation control device 30 transmits the operation mode (the normal mode) and the train diagram to the on-board device 10 of the train 2A at, for example, the departure time of the train 2A (Step S1). In this case, these data may be transmitted to the on-board device 10 of the train 2A through the station I/F device 20 (Steps S1-01/S1-02). The on-board device 10 of the train 2A stores these data in the storage unit 12 (Step S2).

The on-board device 10 (the different train state checking section 72) of the train 2A inquires the train related data to the on-board device 10 of the different train 2B (Step S3). The on-board device 10 of the train 2B transmits the train related data of the train 2B to the on-board device 10 of the train 2A in response to the inquiry (Step S4). The on-board device 10 (the different train state checking section 72) of the train 2A stores the data in the storage unit 12 (Step S5). The train related data contains the traveling permission limit position data, the arrival scheduled platform data, the traveling direction data, the traveling route data, the traveling line data, and the operation mode data (the traveling route request time data, and the train position data). The different train 2 having received the inquiry is the preceding train 2B related to the train interval protection in this case. Here, in the operation mode in which entering of the train from the crossover 53M is predicted, the inquiry is issued to the trains 2 in a neighbor field (within a predetermined distance) containing the train on an opposite line in addition to the preceding train.

The on-board device 10 (the station state checking section 73) of the train 2A inquires the station related data to the station I/F devices 20 of the station 3A and the station 3B (Step S6-1/S6-2). The station I/F device 20 of the station 3A inquires the railroad switch switching positions to the railroad switches 51A1 to 51A4 in response to the inquiry (Step S7). The railroad switches 51A1 to 51A4 reply the railroad switch switching positions to the station I/F device 20 of the station 3A (Step S9). In the same way, the station I/F device 20 of the station 3B inquires the switching positions to the railroad switches 51B1 to 51B4 in response to the inquiry (Step S8). The railroad switches 51B1 to 51B4 reply the railroad switch switching positions to the station I/F device 20 of the station 3B (Step S10). The station I/F devices 20 of the station 3A and the station 3B transmit the station related data of the station 3A and the station 3B to the on-board device 10 of the train 2A (Steps S11/S12). The on-board device 10 (the station state checking section 73) of the train 2A stores the data in the storage unit 12 (Step S13). The station related data contains the railroad switch switching position data, and the inter-station section state data. The stations 3 as an inquiry destination are the current station 3A and the next station 3B related to the train interval protection in this case. Note that when the station I/F device 20 always grasps the railroad switch switching position data, the steps S7 to S10 can be omitted.

In this way, the train 2A inquires necessary data to the other devices (a plurality of different on-board devices 10, a plurality of station I/F devices 20, and an operation control device 30) regularly or according to necessity and acquires the data.

Next, the train interval protection in case of inter-station traveling of the train in the intermediate station portion will be described specifically.

Figure 9A:
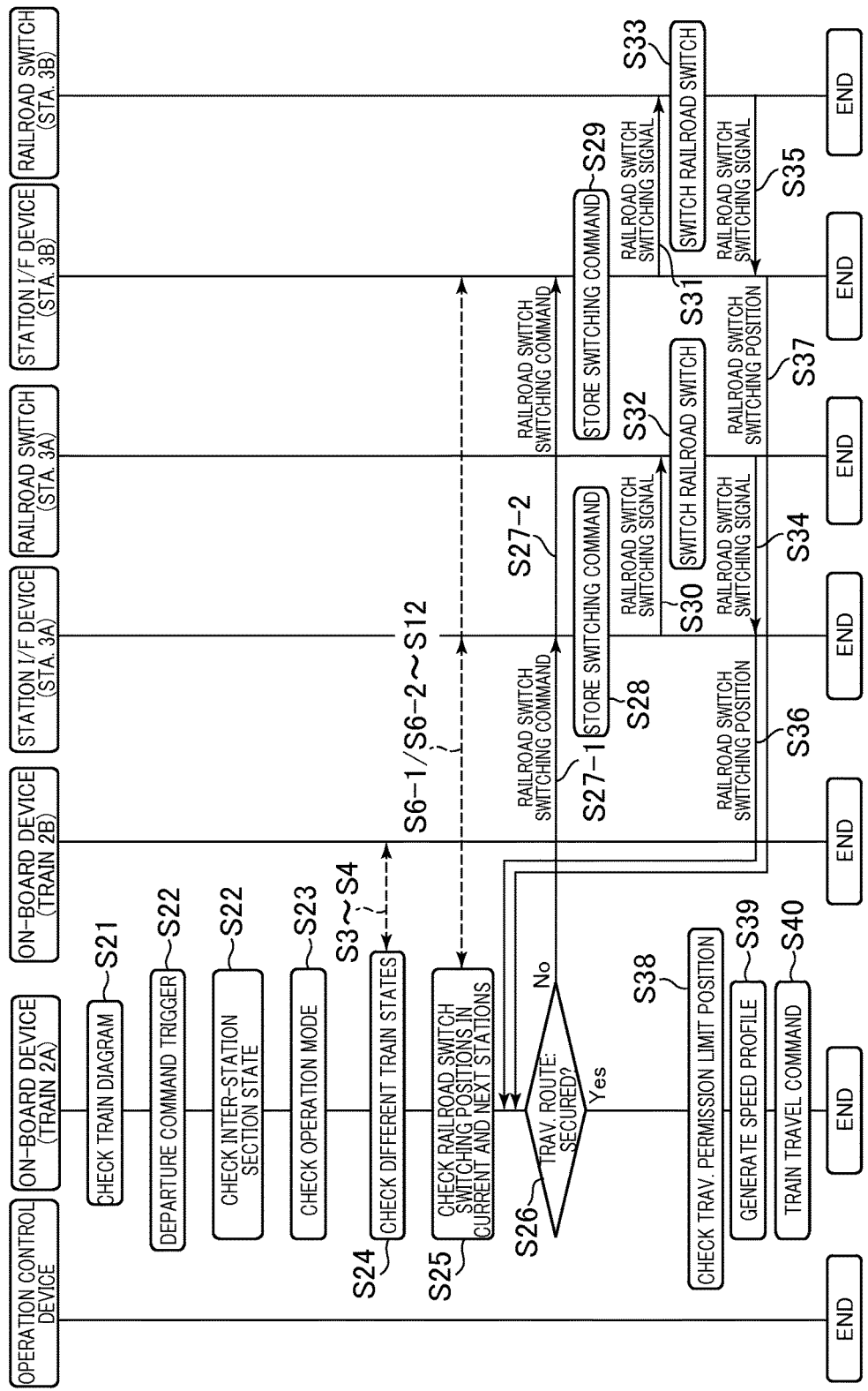
FIG. 9A is a flow chart showing an operation of the train interval protection in case of inter-station traveling of the train in the intermediate station portion.

FIG. 9A is a flow chart showing the operation of the train interval protection in case of inter-station traveling of the train in the intermediate station section. The on-board device 10 of the train 2 carries out the traveling route securement and the traveling permission by the train 2 itself based on the exchange of data with the above-mentioned different device. In this case, the attention should be paid to the on-board device 10 of the train 2A in FIG. 7.

The on-board device 10 (the train diagram checking section 95) of the train 2 reads the train diagram from the storage unit 12 and checks the departure time (Step S21). Then, when the departure time comes, the on-board device 10 issues a departure command (Step S22).

Next, the on-board device 10 (the operation mode checking section 71) of the train 2 reads the operation mode from the storage unit 12 and confirms that the operation mode is the normal mode (Step S23). Thus, it is checked and confirmed that any failure has not occurred on the railroad track 50 and that the traveling route of the train 2A on the railroad track 53D of the outbound line is a traveling route which destines for the next station 3B on the railroad track 53D.

Next, the on-board device 10 (the different train state checking section 72) of the train 2A checks the state of a different train 2 (the train 2B) (Step S24). For example, this step can be executed like the steps S3 to S5 in FIG. 8. Thus, the on-board device 10 acquires the train related data P1 of the train 2B (the traveling permission limit position data, the arrival scheduled platform data, the traveling direction data, the traveling route data, the traveling line data, and the operation mode data). It is possible to check whether or not the train 2B is in the normal mode, based on the operation mode data. The next destination of the train 2B (the station 3) can be checked based on the arrival scheduled platform data, the traveling direction data, the traveling route data, and the traveling line data. By the traveling permission limit position data, the distance 181 (position 180) to which the train 2A can travel can be confirmed. The train related data P1 can be acquired without passing through the control center 4.

Next, the on-board device 10 of the train 2A (the station state checking section 73) checks the states of the stations 3 (the station 3A and the station 3B) (Step S25). For example, this step can be executed like the steps S6-1/S6-2 to S13 in FIG. 8. Thus, the station related data P2 and P3 (the railroad switch switching position data, and the inter-station section state data) are acquired. Whether there is a failure in the inter-station section and whether the on-rail train clearance between the stations has been achieved can be checked based on the inter-station section state data. Based on the railroad switch switching position data, it can be checked whether the switching positions of the railroad switches 51A1, 51A2, 51B2, 51B1 have been secured which are on the traveling route of the train 2A. These station related data P2 and P3 can be acquired without passing through the control center 4.

Next, the on-board device 10 of the train 2A (the traveling route establishing section 74) checks the on-rail clearance between the stations and determines whether or not the traveling route of the train 2A has been secured, based on the railroad switch switching position data of the station related data P2 and P3 (Step S26). That is, it is determined whether the switching positions of the railroad switches 51A1, 51A2, 51B2, and 51B1 cause any problem in the traveling of the train 2A from the station 3A to the next station 3B. Specifically, whether or not the railroad switches 51 are secured and be locked is determined in response to the railroad switch switching command from the train 2A. When the traveling route has not been secured (Step S26: No), the traveling route establishing section 74 outputs the railroad switch switching command to the station I/F device 20 of the station 3 (the station 3A, the station 3B) to which the railroad switches 51 (51A1, 51A2, 51B2, and 51B1) to be switched belong (Steps S27-1/S27-2).

The station I/F device 20 (the railroad switch operating section 25) relates the railroad switch switching command to the train 2A and stores them in the station storage unit 22 (Steps S28/S29). Then, the railroad switch switching signal is outputted to the targeted railroad switches 51 (51A1, 51A2, 51B2, 51B1) in response to the railroad switch switching command (Steps S30/S31). The targeted railroad switches 51 (51A1, 51A2, 51B2, and 51B1) are switched in response to the railroad switch switching signal (Steps S32/S33), and outputs a switching confirmation signal to the station I/F device 20 (Steps S34/S35). The station I/F device 20 (the railroad switch operating section 25) outputs the railroad switch switching positions to the on-board device 10 of the train 2A in response to the switching confirmation signal (Steps S36/S37). At this time, the railroad switch switching command is stored in the station storage unit 22 so that the railroad switches 51 are locked by the station I/F device 20 (the railroad switch operating section 25). For example, the railroad switch switching signal from the station I/F device 20 (the railroad switch operating section 25) is set to a high level, and the signal is continuously outputted. The locking state is continued until the train 2A passes away, the station I/F device 20 receives the railroad switch release command from the on-board device 10 of the train 2A, and the station I/F device 20 erases the railroad switch switching signal. In this case, even if the railroad switch switching signal is erased, the switching position of the railroad switch 51 may be held without being moved just as it is, until the railroad switch switching command is received from the succeeding train to the train 2A.

The traveling route establishing section 74 of the on-board device 10 determines whether or not the traveling route of the train 2A has been secured in response to the railroad switch switching positions (Step S26). When the traveling route has been secured (Step S26: Yes), the traveling route establishing section 74 advances toward step S38. Thus, the traveling route securement for the train 2A completes.

Note that the determination for the first time may be made as NO at step S26 so that the steps S27 to S36 are executed, regardless of whether the traveling route has been secured (whether or not the switching positions of the railroad switches 51A1, 51A2, 51B2, 51B1 have any problem in the traveling of the train 2A to the next station 3B). That is, the command (the railroad switch switching command) for the switching and maintenance (locking) may be outputted to (the station I/F device 20 corresponding to) the railroad switches 51 on the traveling route at least once. Thus, the traveling route can be more surely secured.

Next, the on-board device 10 of the train 2A (the traveling permission limit position checking section 81) checks the traveling permission limit position. That is, a distance 181 (position 180) by which the train 2A can travel is checked (Step S38). In a range to the traveling permission limit position, the on-board device 10 of the train 2A issues the traveling permission. Regarding the traveling permission, a permission range is set in the range between the train 2A and the train 2B (e.g. the distance to the traveling permission limit position). Therefore, it is not necessary to provide a conventional closed section and so on and the facilities can be simplified.

Next, the on-board device 10 (the speed profile generating section 94) of the train 2A, i.e. the speed profile generating section 94 generates a speed limit profile indicating an upper limit value of the speed when traveling from the current station 3A to the next station 3B, based on the traveling permission limit position, i.e. based on the distance from the targeted train 2 to the traveling permission limitation position (Step S39). After that, the on-board device 10 (the traveling section 91) of the train 2A starts traveling of the train 2A based on the basic data 134 (the linear structure, the vehicle characteristic and so on) stored in the storage unit 12, while referring to the speed limit profile, so that the train 2A travels to the next station 3B according to the train diagram (Step S40).

As mentioned above, the train interval protection in the inter-station traveling of the train in the intermediate station portion is carried out.

Here, the release of the locking state of a branch (the railroad switch 51) will be described.

Figure 9B:
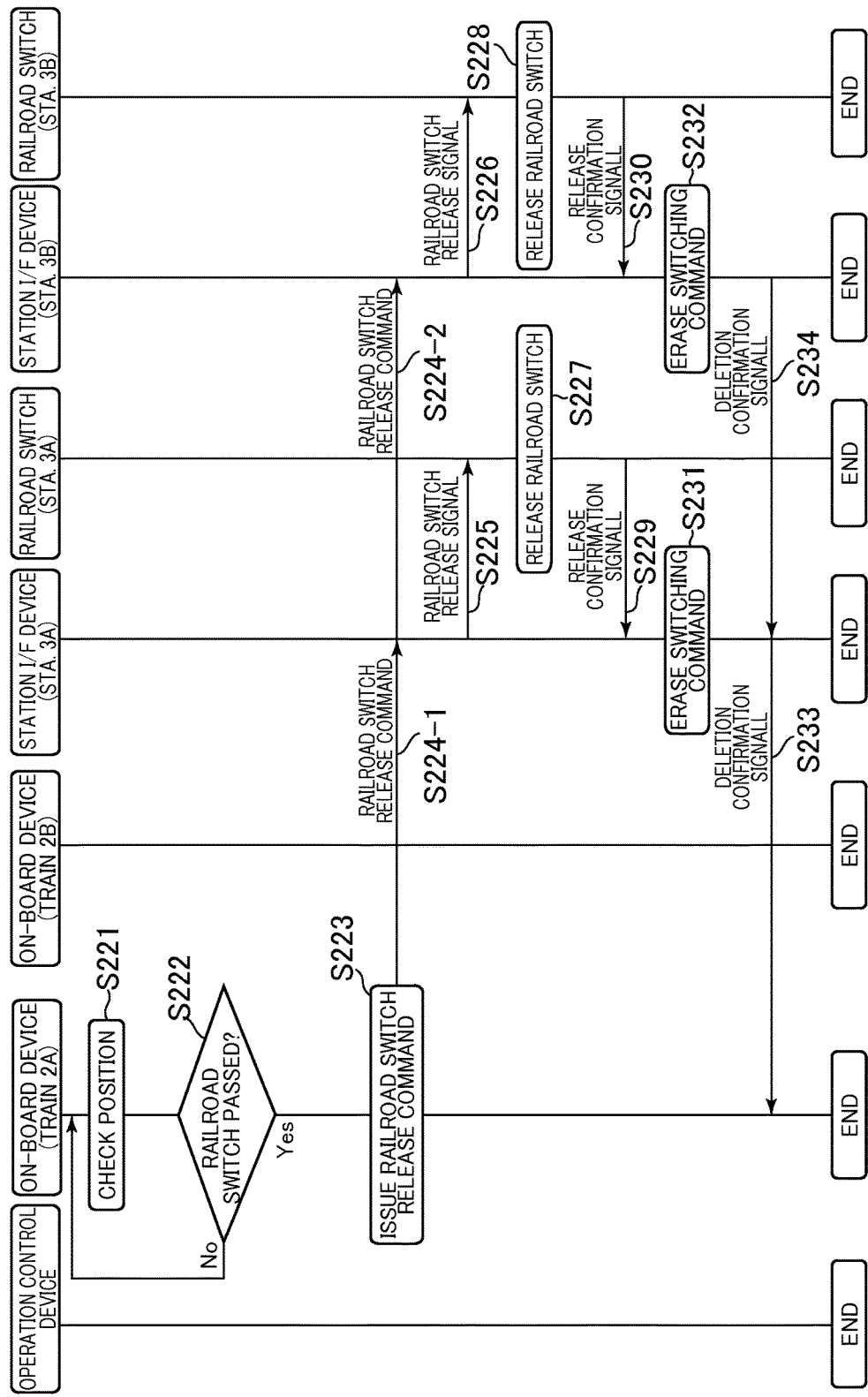
FIG. 9B is a flow chart showing an operation when the on-board device of the train controls the station I/F device to carry out a branch release.

FIG. 9B is a flow chart showing an operation when the on-board device of the train instructs the station I/F device to release the branch. The train 2A travels on the traveling route secured for the train 2A, and passes through the railroad switches 51. The on-board device 10 (the train traveling control section 90) of the train 2A checks its own position (S221). Then, the on-board device 10 determines whether or not the train 2A has passed through the railroad switches 51 (Step S222). When having passed (Step S222: Yes), the on-board device 10 (the train traveling control section 90) issues a railroad switch release command (Step S223) to the station I/F device 20 (Steps S224-1/S224-2). When receiving the railroad switch release command, the station I/F device 20 (the railroad switch operating section 25) outputs a railroad switch release signal to the railroad switches 51 or sets the railroad switch switching command signal to a low level (Steps S225/S226). As a result, the locked states of the railroad switches 51 are released (Steps S227/S228). The railroad switch 51 outputs a release signal indicating the release of the lock state, to the station I/F device 20 (Steps S229/S230). The station I/F device 20 (the railroad switch operating section 25) erases the stored railroad switch switching command (Steps S231/S232) and outputs an erasure confirmation data to the on-board device 10 of the train 2A (Steps S233/S234).

In the present embodiment, the on-board device 10 of the train 2 can carry out the train interval protection in the normal mode by receiving the train related data from the different train 2, by receiving the station related data from the station I/F device 20 of the station 3, and by communicating with the station I/F device 20 according to necessity. That is, in the on-board device 10, mainly, the traveling route securement determining section 70 secures a traveling route (the traveling route protection) and the traveling determining section 80 can permit the traveling (the collision protection). As a result, by providing the function of the train interval protection to the on-board device 10, it becomes unnecessary to provide the ATP ground device 232, the station control device 234 and the interlocking device 236 to the control center, unlike the configuration of FIG. 1A. Thus, a space for the ATP ground device 232, the station control device 234 and the interlocking device 236 can be reduced and, also, the reduction of the introduction cost becomes possible. Moreover, the maintainability of the equipment can be improved. Moreover, because the train interval protection is carried out by the on-board device as a main device so that the work of a command staff of the control center is changed from the conventional monitoring and controlling operations to the monitoring operation, the work load of the command staff and the skill required to the staff can be made lower.

Also, the branch control in the present embodiment can be regarded as, mainly, steps S23 to S39 in the above train interval protection. In this case, in the branch control of the present embodiment, a series of sequences of the departure and arrival control and the controls from the traveling route establishment to the traveling permission can be realized by the cooperation of the on-board device 10 and the station I/F device 20. Thus, the time until the train 2 starts the traveling from the station 3 can be reduced. In this way, the function of the branch control can be accomplished by the on-board device 10 and the station I/F device 20. Moreover, because the on-board device 10 and the station I/F device 20 narrow a sequence range, a process time to the railroad switch switching can be shortened. That is, because the time until the train 2 departs the station 3 can be reduced, the transportation capacity can be reinforced.

Second Embodiment

The signaling system according to a second embodiment of the present invention will be described. In the present embodiment, the control of a train 2 in the railyard will be described in the signaling system having the configuration described in the first embodiment. Specifically, the processing in which a vehicle (a train) in the standby field travels to the inspection field and which has been conventionally carried out manually by a command staff is automated. That is, the vehicle (the train) determines a traveling timing autonomously and travels to a destination point. Below, a difference point from the first embodiment will be mainly described. However, in the present embodiment, "the train" may be 1-car train or a train of a plurality of cars. The train and the vehicle are supposed to be used in the same meaning.

1. Configuration

Figure 10:
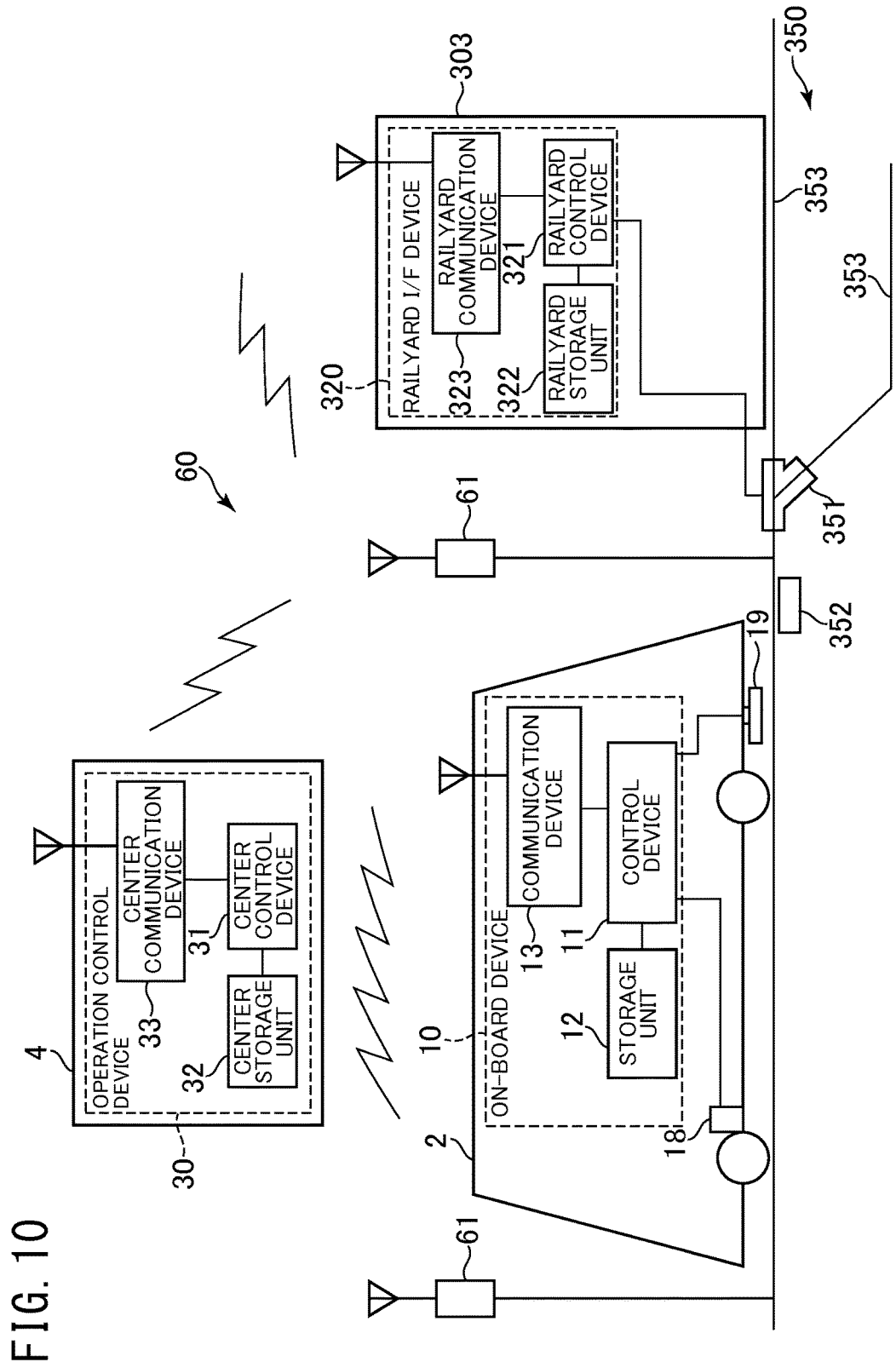
FIG. 10 is a block diagram showing a configuration example of the signaling system according to a second embodiment.

FIG. 10 is a block diagram showing a configuration example of the signaling system according to the present embodiment. FIG. 10 mainly shows a railyard 300, and a station 3 and a railroad track 50 of the main line are omitted. The railyard 300 is provided with a railroad track 350 and a railyard I/F device 320. The railroad track 350 is connected with the railroad track 50 of the main line and has a plurality of railway switches 351. They are used when the train 2 enters the railyard 300 from the railroad track 50 for standby and inspection. The railyard I/F device 320 is provided in a railyard control center 303. The railyard I/F device 320 controls the switching of the plurality of railway switches 351 based on the control of the on-board device 10.

The operation control device 30 and the train 2 are as in the first embodiment. The general-purpose LAN 60 is as in the first embodiment. The plurality of base stations 61 are arranged at a plurality of positions along the railroad track 350 in the railyard in addition to the control center 4, the stations 3 and the railroad track 50. The base stations 61 mediate a radio communication with the operation control device 30, the plurality of on-board devices 10, the plurality of station I/F devices 20 and the railyard I/F device 320 to allow the transmission and reception of the data.

The railyard I/F device 320 is provided with a railyard control device 321, a railyard storage unit 322 and a railyard communication device 323. The railyard control device 321 is an information processing unit which is exemplified by a computer, and is provided a CPU, a storage section, an input section, an output section and an interface, which are not shown. The railyard I/F device 320 executes information processing for the railyard I/F device 320. The railyard storage unit 322 is a storage unit which is exemplified by a hard disk drive, RAM or ROM, stores data and a software program which is used in the railyard control device 321, or which is outputted from the railyard control device 321. The railroad communication device 323 is a radio LAN transmitting and receiving unit which carries out a data communication through the general-purpose LAN 60. The railroad communication device 323 transmits the data and the software program from the railyard control device 321 to the operation control device 30, the on-board devices 10 and the station I/F devices 20, and receives the data and the software program from the operation control device 30, the on-board devices 10 and the station I/F devices 20 to the railyard control device 321.

The railyard control device 321 is also connected with the plurality of railway switches 351 (a plurality of branches) of the railroad track 350 (arranged in the neighborhood to the railyard control center 303) in the railyard 300. The railway switch 351 is a branch of the railroad track 353. The railyard control device 321 detects the state of each of the plurality of railway switches 351 and controls the switching of each of the plurality of railway switches 351. A track antenna beacon (transponder) 352 may be installed in the railroad track 351.

Next, the control device 11 of the on-board device 10 will be more described.

Figure 11:
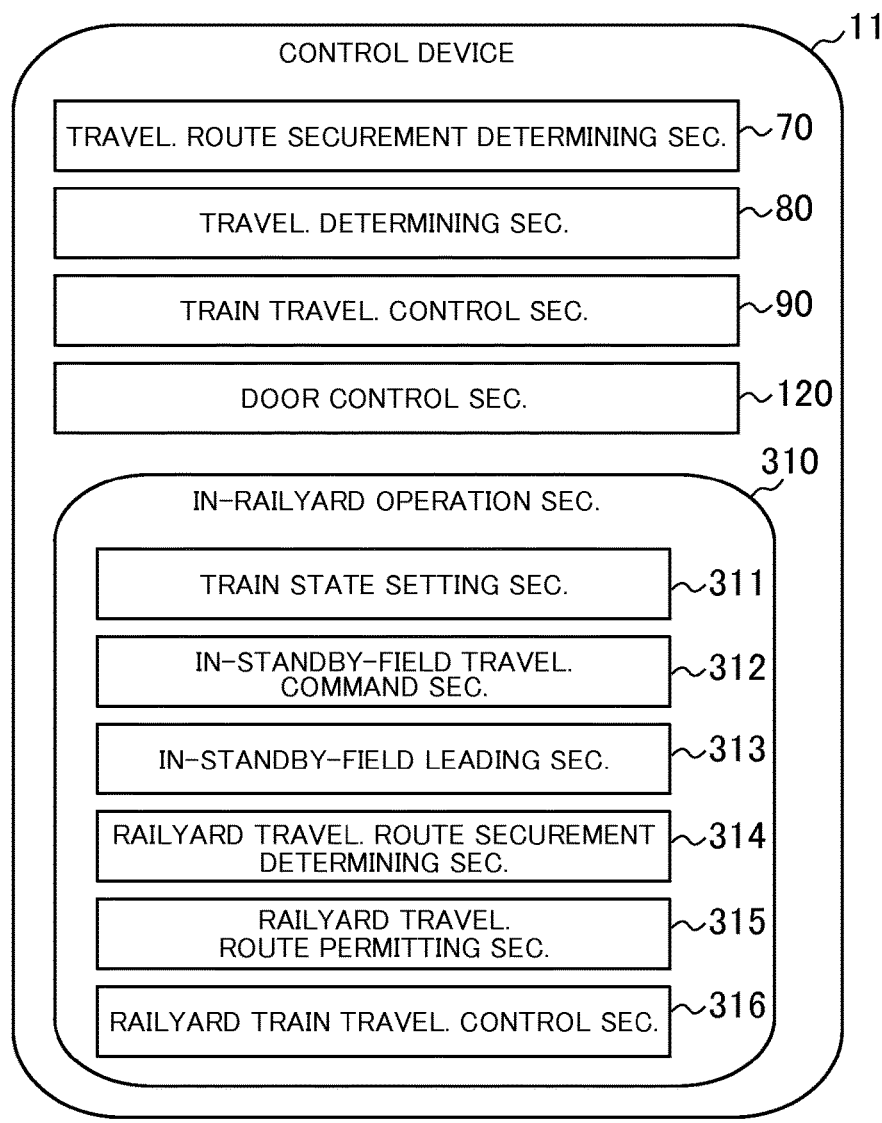
FIG. 11 is a block diagram showing a configuration example of the control device of the on-board device in the signaling system according to a second embodiment.

FIG. 11 is a block diagram showing a configuration example of the control device 11 in the signaling system according to the present embodiment. Moreover, the control device 11 is provided with an in-railyard operation section 310 in addition to the traveling route securement determining section 70 to the door control section 120.

The in-railyard operation section 310 of the train 2 controls the operation of the train 2 in the railyard 300. The in-railyard operation section 310 is provided with a train state setting section 311, an in-standby-field traveling command section 312, an in-standby-field leading section 313, a railyard traveling route securement determining section 314, a railyard traveling route permitting section 315, and a railyard train traveling control section 316. The train state setting section 311 sets its train 2 to an inspection waiting state or another state. The in-standby-field travel command section 312 instructs its train 2 to travel in the standby field or from the standby field to the inspection field. The in-standby-field leading section 313 travels while leading vehicles (trains) in the neighborhood to its train 2 based on a traveling request from another train. The railyard traveling route securement determining section 314 carries out the protection of the traveling route of the train 2. Specifically, the railyard traveling route securement determining section 314 checks the railway switch switching position showing a switching position of each of the railway switches 351 through the railyard I/F device 320, and carries out the switching control which switches the railway switches 351 according to necessity. The railyard traveling route permitting section 315 carries out the control of collision prevention between the train 2A and a train 2B near the train 2A. Specifically, the traveling permission section 315 carries out the communication with the near trains 2 to grasp a range where its train 2 is permitted to travel, and permits the traveling of its train 2 in the range. The railyard train traveling control section 316 controls the traveling (running) of its train 2.

Next, the railyard control device 321 of the railyard I/F device 320 will be more described.

Figure 12:
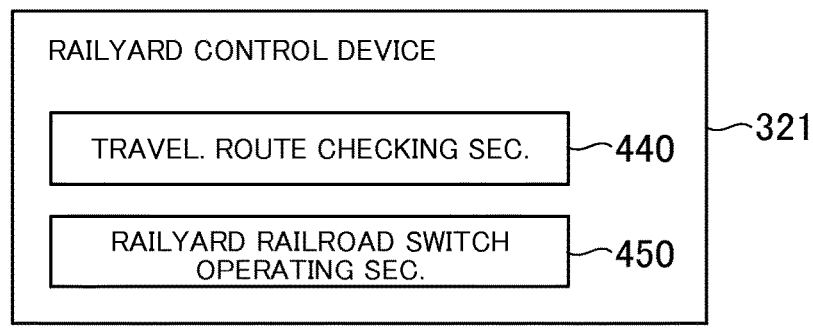
FIG. 12 is a block diagram showing a configuration example of a railyard control device of a railyard I/F device in the signaling system according to the second embodiment.

FIG. 12 is a block diagram showing a configuration example of the railyard control device 321 in the signaling system according to the present embodiment. In the railyard control device 321, a CPU develops in RAM, a computer program which was installed in a hard disk drive through an interface from a storage medium. Then, the CPU executes the developed computer program to realize information processing of the computer program while controlling hardware resources such as a storage section, an input section, an output section, an interface, the railyard storage unit 322 and the railyard communication device 323 according to need. The storage section and the railyard storage unit 322 store the computer program and store data used by the CPU and data generated by the CPU. The input section outputs data inputted by a user or generated through an operation of another device to the CPU and the storage section. The output section outputs data generated by the CPU and data stored in the storage section to the user and another device to be recognizable. The railyard control device 321 controls the switching of the railway switches 351 on the railroad track 350. The railyard control device 321 is provided with a traveling route checking section 440 and a railyard railway switch operating section 450. The traveling route checking section 440 checks whether or not a traveling route can be secured in response to on a request from the on-board device 10 of the train 2. The railyard railway switch operating section 450 detects the switching state of the railway switch 351, operates and locks the railway switches 351, stores a command to the railway switches 351 and outputs data of the railway switches 351.

Next, the main data stored in the railyard storage unit 322 will be described.

Figure 13:
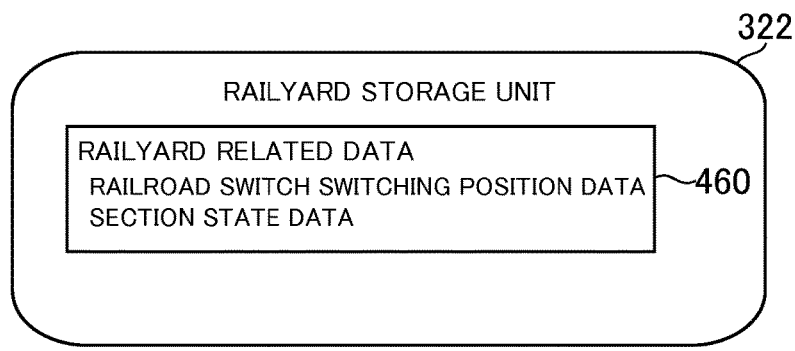
FIG. 13 is a block diagram showing the configuration of a railyard storage unit of the railyard I/F device in the signaling system according to the second embodiment.

FIG. 13 is a block diagram showing the configuration of the railyard storage unit 322 in the signaling system according to the present embodiment. The railyard storage unit 322 contains the railyard related data 460 at least.

The railyard related data 460 contains data related to the railroad track 350 in the railyard 300. The railyard related data 460 contains railway switch switching position data and section related data. The railway switch switching position data shows a switching position of each of a plurality of railway switches 351 in the railroad track 350, and contains railway switch command data to each railway switch 351. The railway switch command data shows a railway switch switching command from the train 2 to each of the plurality of railway switches 351. A railway switch switching command is a command instructing the switching of the railway switches 351, and is related to data of a transmission source train 2 to be stored. While the railway switch switching command is retained, the railway switch 351 maintains (lock) the switching state. When the railway switch switching command is erased in response to a railway switch release command from the transmission source train 2, the lock state of the railway switch 351 is released. The section related data shows whether or not there is a failure in the railroad track 350 or whether or not the railroad track 350 is occupied.

2. Operation

Next, the operation of the signaling system according to the present embodiment will be described. In this case, as the operation of the signaling system, the control of trains 2 in the railyard 300 will be described.

A configuration example of the railroad track 350 in the railyard 300 to which the signaling system is applied, before describing of a specific operation will be described.

Figure 14:
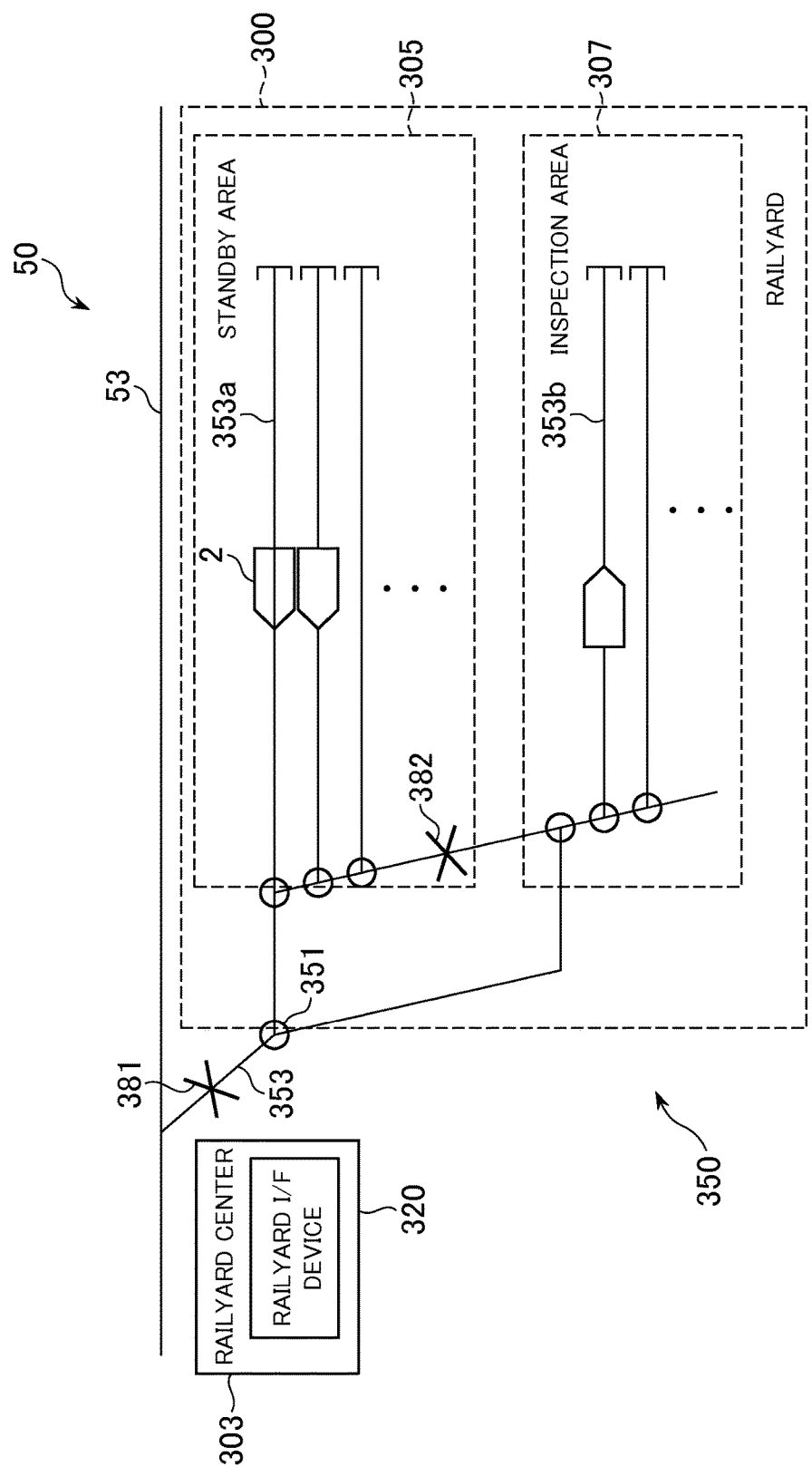
FIG. 14 is a diagram schematically showing a configuration example of railroad tracks in the railyard to which the signaling system according to the second embodiment is applied.

FIG. 14 is a diagram schematically showing a configuration example of the railroad track 350 in the railyard 300 to which the signaling system according to the present embodiment is applied. The railyard 300 is provided with the railroad track 350 connected with the railroad track 50 of the main line. For example, it is provided with a railroad track 353 connected with a railroad track 53. This railroad track 353 branches into a plurality of railroad tracks 353a in the standby field 305 and a plurality of railroad tracks 353b in the inspection field 307. The railway switches 351 are provided to the branch positions. The railway switch switching positions of the railway switches 351 are grasped and controlled by the railyard I/F device 320. Below, the operation of the signaling system in such a railyard 300 will be described.

First, an operation of setting whether or not the train 2 is in the inspection waiting state, will be described as the operation of the signaling system.

The on-board device 10 of each of the trains 2 stores inspection date and time or the on-line date and time after the inspection in the storage unit 12. Then, every time the train 2 enters the waiting condition in the standby field 305, the on-board device updates (accumulates) the traveling time on the railroad track 50 of the main line and stores it in the storage unit 12. When the accumulated traveling time exceeds a reference traveling time prescribed for the inspection, the on-board device recognizes that its train 2 is an inspection object and issues an inspection command. A flow of processes from a time when the train 2 enters the on-line state to a time when it recognizes to be in "the inspection waiting state" on the standby line is shown below.

Figure 15:
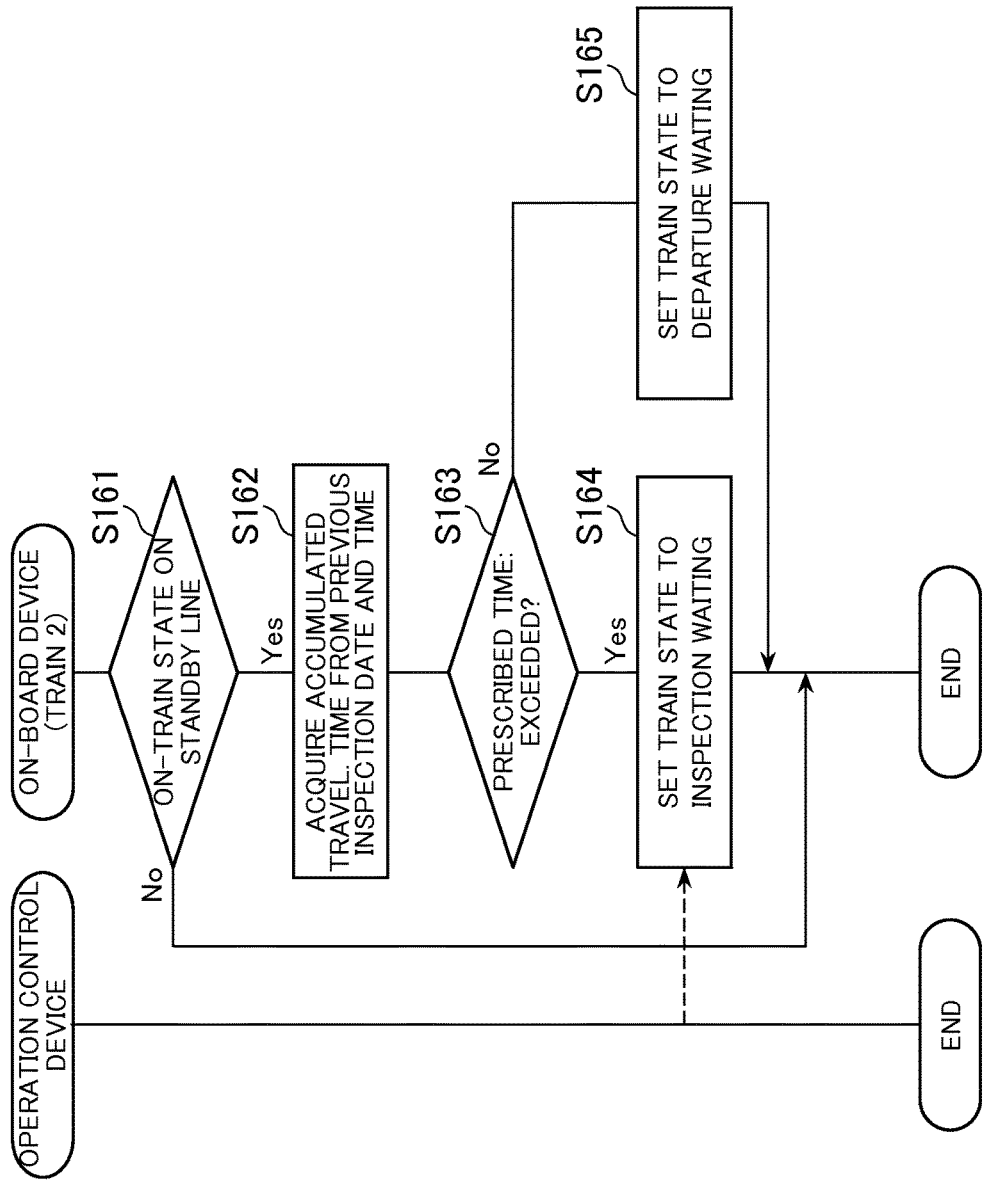
FIG. 15 is a flow chart showing an operation of setting the train to an inspection waiting state.

FIG. 15 is a flow chart showing the operation of setting whether or not the train is in the inspection waiting state.

The on-board device 10 of the train 2 (train state setting section 311) determines whether the train 2 is in the on-line state in the standby field 305 at present, based on the position of the train 2 and the position of the standby field 305 in the railyard 300 (Step S161). When the train 2 is not in the standby field 305 (step S161: No), the process ends. When the train is in the standby field 305 (Step S161: Yes), the train state setting section 311 acquires the accumulated traveling time since the previous inspection date and time from the storage unit 12 (Step S162). The train state setting section 311 determines whether or not the accumulated traveling time exceeds a prescribed time (Step S163). When the accumulated traveling time exceeds the prescribed time (Step S163: Yes), the train state setting section 311 sets "the train state" to "an inspection waiting state" and stores it in the storage unit 12 (Step S164). When the accumulated traveling time does not exceed the prescribed time (Step S163: No), the train state setting section 311 sets "the train state" to "a departure waiting state" and stores it in the storage unit 12 (Step S165). In this case, in response to an interrupt of an inspection request from the operation control device 30, "the train state" is sometimes set to "the inspection waiting state" (Step S164).

As mentioned above, the train 2 according to the present embodiment sets whether or not the train 2 is in the inspection waiting state.

In this way, the on-board device 10 of the train 2 according to the present embodiment can autonomously (automatically) grasp whether or not its train is in the inspection waiting state. Thus, the traveling to the inspection field can be autonomously started, as mentioned later.

Next, the operation of removing a vehicle which becomes a blockade of the traveling will be described as the operation of the signaling system.

Figure 16A:
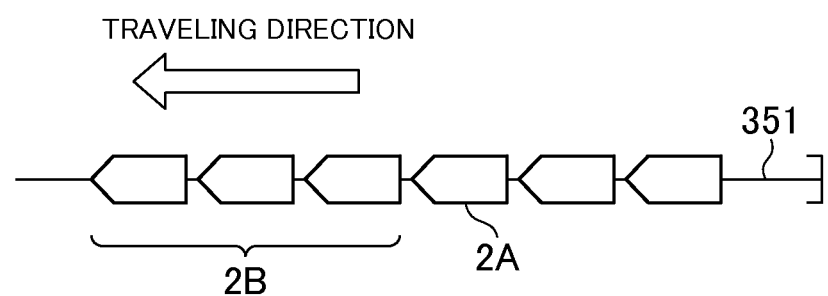
FIG. 16A is a diagram schematically showing a situation that there is a blockade vehicle which hinders the traveling of a vehicle in the inspection waiting state.
Figure 16B:
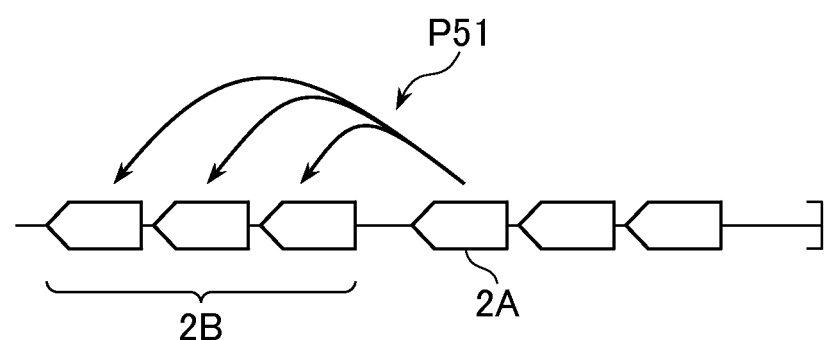
FIG. 16B is a diagram schematically showing a situation that there is a blockade vehicle which hinders the traveling of a vehicle in the inspection waiting state.

FIG. 16A and FIG. 16B are diagrams schematically showing a situation that vehicles exist which serve as a blockade in the traveling of an inspection waiting vehicle (train 2). First, with reference to FIG. 16A, a case is supposed where the inspection waiting vehicle (train 2A) exists on the railroad track 353a as the standby line. In an example of FIG. 16A, the plurality of vehicles (trains 2B) exist in front of the inspection waiting vehicle (train 2A). Specifically, three vehicles (train 2B) exist in front of the inspection waiting vehicle (train 2A). In this case, in the present embodiment, the traveling of the vehicles in the standby field 305 is supposed to be not one train by one train but collectively in units of a plurality of vehicles (a plurality of trains 2). Specifically, with reference to FIG. 16B, the vehicle (train 2A) outputs a traveling command P51 to the three vehicles (trains 2B) at a same time. In this case, the three vehicles (train 2B) check their positions and the head vehicle controls the three vehicles as a group. When reaching a turn-around point, the head vehicle is changed to a last vehicle. The collected vehicles (trains 2B) travel in synchronization with each other in operation without being connected. As a synchronization method among the vehicles, for example, a method is employed in which the head vehicle notifies (the target speed −1 km/hr) to the succeeding vehicle periodically as a target speed of the succeeding vehicle.

Next, the operation of removing the vehicles serving as the blockade in the traveling of the inspection waiting vehicle will be specifically described.

Figure 17:
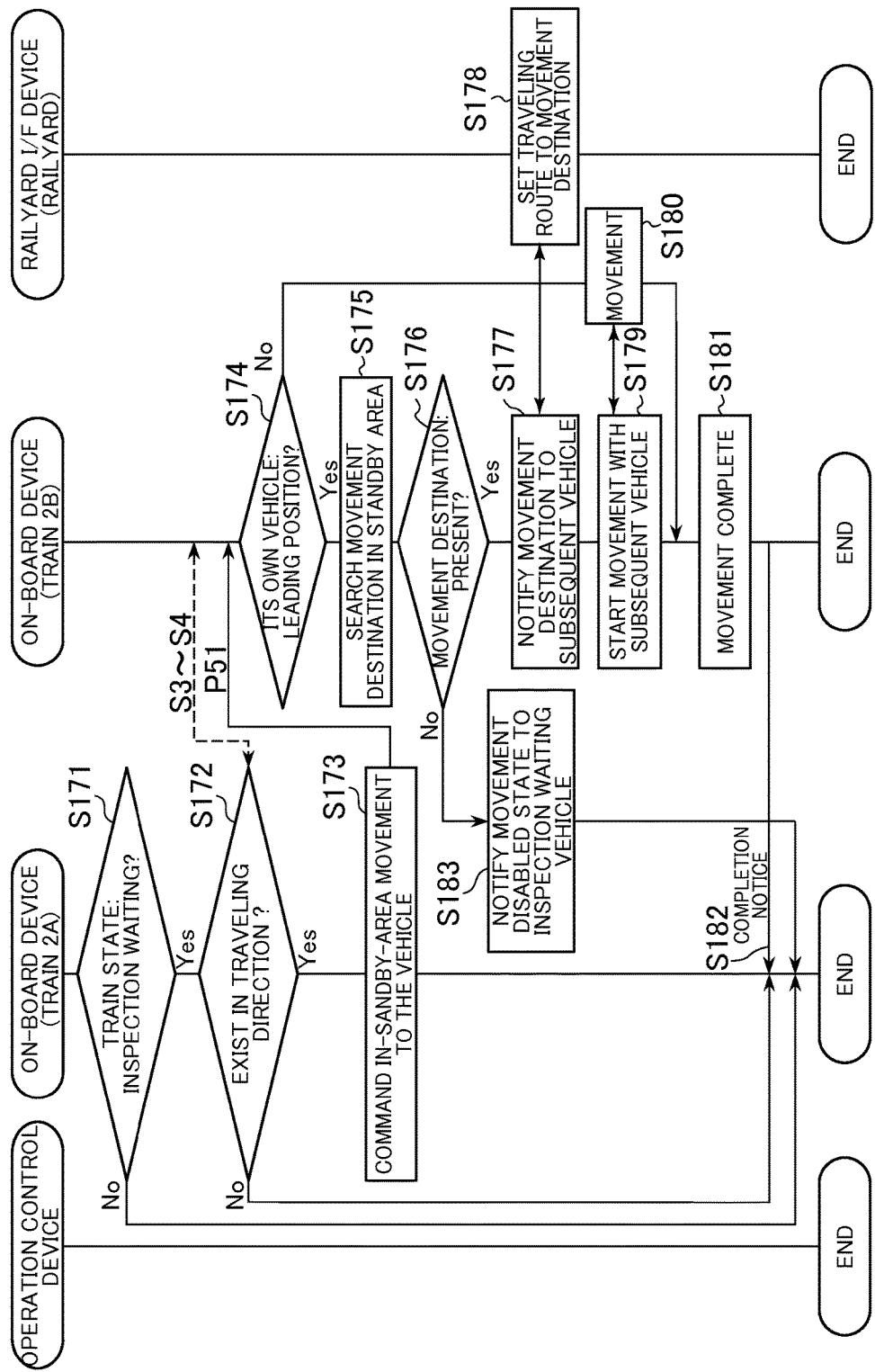
FIG. 17 is a flow chart showing an operation of removing the blockade vehicle which hinders the traveling of the vehicle in the inspection waiting state.

FIG. 17 is a flow chart showing the operation of removing the vehicles serving as the blockade in the traveling of the inspection waiting vehicle. The on-board device 10 (the in-standby-field travel instructing section 312) of the train 2A refers to the storage unit 12 and determines whether or not the train 2A is in the inspection waiting state (Step S171). The check at this step S171 can be carried out by executing the above steps S161 to S165. Next, when the train 2A is not in the "inspection waiting state" (step S171: No), the process ends. On the other hand, when the train 2A is in the "inspection waiting state" (Step S171: Yes), the in-standby-field travel instructing section 312 determines whether or not there is a different vehicle (train 2B) which blocks the traveling to the inspection field 307 on the railroad track 353a where the train 2A exists (Step S172). For example, the in-standby-field travel instructing section 312 can determine this by acquiring the train related data (the train position data) of the different vehicles (trains 2) at the steps S3 to S4 in the first embodiment. In this case, it is supposed that the different vehicle (train 2B) which blocks the traveling is not in the "inspection waiting state". That is, when the different vehicle which blocks the traveling is in the "inspection waiting state", the traveling of the vehicle is carried out with a priority. In the present embodiment, the train state is supposed to be contained in the train related data. Also, when there is a different vehicle (train 2B) which blocks the traveling of the train 2A (Step S172: Yes), the in-standby-field travel instructing section 312 outputs the traveling command P51 to the different vehicle (train 2B) to make it to travel to another standby line (Step S173). In case of FIG. 16A, the different vehicles (trains 2B) are on the standby line (the railroad track 353a) where the train 2A exists, and moreover block the traveling to the inspection field 307. In this case, the train 2A outputs the traveling command P51 to the three vehicles (trains 2B).

The on-board device 10 (the in-standby-field leading section 313) of the different vehicle (train 2B) determines whether or not the different vehicle is the head vehicle, in response to the traveling command (Step S174). For example, the in-standby-field leading section 313 can determine this by acquiring the train related data (the train position data) of the different vehicles (trains 2) at the steps S3 to S4 in the first embodiment. Also, when it is determined that the vehicle is the head vehicle (Step S174: Yes), the in-standby-field leading section 313 searches as a traveling destination, a standby line on which any vehicle is not in the on-line state and to which the trains can travel, from among the standby lines (the railroad tracks 353a) in the standby field 305 (Step S175). For example, the existence or non-existence of the vehicle can be determined by acquiring the train related data (the train position data) of the vehicles (trains 2) in its periphery at the steps S3 to S4 in the first embodiment. Then, when the traveling destination is searched (Step S176: Yes), the in-standby-field leading section 313 notifies the traveling destination to the succeeding vehicles (Step S177). The securement of a traveling route to the traveling destination (steps S177 and S178) is carried out by, for example, executing the steps S24 to S38 in the first embodiment by the railyard traveling route securement determining section 314 and the traveling permission section 315 in addition to the railyard I/F device 320 and switching the railway switches 351 on the traveling route appropriately. In this case, the railyard traveling route securement determining section 314, the traveling permission section 315, the railyard I/F device 320, the railway switches 351 are supposed to correspond to the traveling route securing 70, the traveling permission section 80, the station I/F device 20, and the railway switches 51, respectively. After that, the in-standby-field leading section 313 starts the traveling to the traveling destination to take the succeeding vehicles (Step S179). At that time, the succeeding vehicle (step S174: No) travels according to the preceding vehicle (Step S180). When the traveling is completed, the in-standby-field leading section 313 outputs a traveling completion notice (Step S182). On the other hand, when there is no traveling destination (Step S176: No), the in-standby-field leading section 313 notifies that the vehicle (train 2A) cannot change to the "inspection waiting state" (Step S183). In this case, the process ends there.

As mentioned above, the different vehicles serving as the blockade in the traveling of the "inspection waiting" vehicle (train 2A) are removed from the standby line (the railroad track 353a). Note that when the number of the different vehicles serving as the blockade is one, the steps S174 to S181 executed for the one vehicle while omitting the process of leading the succeeding vehicle.

In this way, the on-board device 10 of the train 2A according to the present embodiment can autonomously (automatically) evacuate the different trains 2B serving as the blockade in the traveling to the inspection field. In other words, by using inter-train communication among the trains 2, the traveling route of the "inspection waiting" vehicle (train 2A) can be secured without needing assistance of a command staff. Thus, the "inspection waiting" vehicle (train 2A) is possible to travel to a top position of the standby line (the railroad track 353a) to the inspection field 307.

Next, the traveling operation of the inspection waiting vehicle to the inspection field as the operation of the signaling system will be described.

Figure 18:
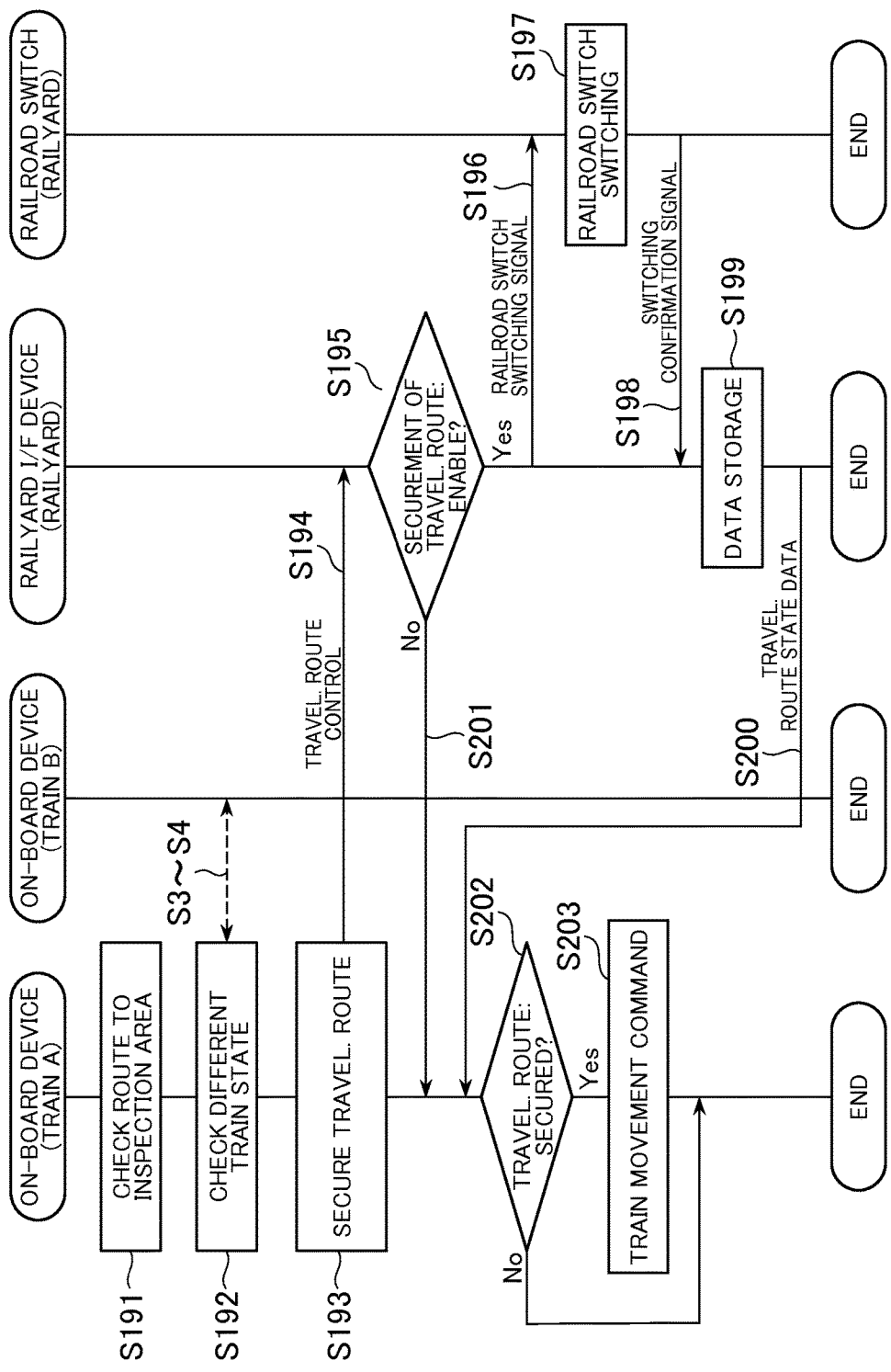
FIG. 18 is a flow chart showing an operation when the vehicle in the inspection waiting state travels to an inspection field.

FIG. 18 is a flow chart showing the operation of the inspection waiting vehicle traveling to the inspection field. The on-board device 10 of the "inspection waiting" vehicle (train 2A) (the railyard train traveling control section 316) controls to travel to the top position of the standby line 353a from which it can travel to the inspection field 307, on the standby line (the railroad track 353a) in the standby field 305. After that, the on-board device 10 of the vehicle (train 2A) (the railyard traveling route securement determining section 314) searches a traveling route (containing the turn-around point) having an inspection line (the railroad track 353b) in the inspection field 307 on which no train is in the on-line state, as a traveling destination (Step S191). Then, the railyard traveling route securement determining section 314 confirms that there is no vehicle in the on-line state on the traveling route (Step S192). For example, the existence or non-existence of the vehicle can be determined by acquiring the train related data (the train position data) of the vehicles (trains 2) in the periphery at the steps S3 to S4 in the first embodiment.

After that, the railyard traveling route securement determining section 314 executes a traveling route securing process (step S193). Specifically, the railyard traveling route securement determining section 314 first transmits a traveling route control command (the railway switch switching command) to the railyard I/F device 320 so as to lock the railway switches 351 on the traveling route (Step S194). The railyard I/F device 320 (traveling route checking section 440) checks whether or not a part of the railroad track on the route was already occupied by another vehicle, in response to the traveling route control command (the railway switch switching command) (Step S195). The determination of whether or not it was occupied can be carried out by, for example, referring to the railway switch switching position data of the railyard related data 460 in the railyard storage unit 322, to check the railway switch switching positions of the railway switches 351 on the traveling route or the railway switch command data of the railway switches 351. Or, it can be carried out by referring to the section state data of the railyard related data 460 to check the occupation state of the railroad track 353. When at least a part of the railroad track on the traveling route is already occupied by another vehicle (Step S195: No), the traveling route checking section 440 refuses the traveling route control command (Step S201). When the railroad track on the traveling route is not occupied (Step S195: Yes), the railyard railroad switch operating section 450 locks the railway switches 351 along the route. Specifically, the railyard railroad switch operating section 450 outputs a railway switch switching signal to the railway switches 351 on the route (Step S196), the railway switches 351 switch (step S197), and the railway switches 351 output switching confirmation signals to the railyard I/F device 320 (Step S198). The railyard railroad switch operating section 450 stores in the railyard storage unit 322, that the traveling route has been occupied by the "inspection waiting" vehicle (i.e. the railway switch switching command) (Step S199). Then, the traveling route checking section 440 replies a traveling route state to the vehicle (train 2A) to notify that the traveling route has been established (Step S200). By storing the traveling route control command (the railway switch switching command) in the railyard storage unit 322 to continue the traveling route control command (the railway switch switching command), the railway switches 351 maintain the switching states (the locked states). When the transmission source train 2 passes through the railway switches 351 and the on-board device 10 of the train 2 outputs a railway switch release command, the railyard railroad switch operating section 450 erases the traveling route control command (the railway switch switching command) to release the locked states of the railway switches 351.

The on-board device 10 of the vehicle (train 2A) (the railyard traveling route securement determining section 314) checks whether or not a traveling route has been established (Step S202). When the traveling route has been established (step S202: Yes), the railyard traveling route permitting section 315 permits the traveling of the train 2A, and the railyard train traveling control section 316 controls the vehicle (train 2A) to travel to the destination (Step S203).

In this way, the "inspection waiting" vehicle (train 2A) travels to the inspection field.

In this way, the on-board device 10 of the train 2A according to the present embodiment can make the train 2A travel to the inspection field autonomously (automatically). In other words, by using the inter-train communication among the trains 2 and the communication between each of the trains 2 and the railyard I/F device, it is possible to make the "inspection waiting" vehicle (train 2A) travel to the inspection line (railroad track 353b) in the inspection field without assistance of a command staff.

According to the present embodiment, the vehicle replacement work can be automated so that the time necessary for the replacement can be reduced at a maximum. Thus, an influence on the replacement of the train between the main line and the railyard can be reduced and the transportation capacity decline can be avoided. Also, when a vehicle on the standby line should be traveled to the inspection field, it is necessary to move the front vehicles on the standby line onto another standby line and then to move the vehicle, if the vehicle is in the on-line state on the standby line. However, in the present embodiment, the vehicle can be automatically moved and the work load of the command staff can be reduced. In addition, it is possible to make the railyard function efficiently.

The program and the data structure of the present invention may be stored in a computer-readable storage medium and may be read into an information processing unit from the storage medium.

The present invention is not limited to each of the above embodiments. It would be understood that each embodiment may be modified or changed appropriately in a range of the technical thought of the present invention.

The present invention has been described above in combination with some embodiments but it would be apparent to a skilled person in the art that these embodiments are merely provided to explain the present invention and must not use to interpret to limit the attached claims.

Part or all of the above-mentioned embodiments and examples can be described as in the following supplemental notes, but are not limited below.

An on-board device of the present invention is loaded in a moving vehicle traveling on a track. The on-board device includes a control device configured to control the traveling of the moving vehicle. The control device includes the on-board device includes a control device configured to control the traveling of the moving vehicle. The control device includes: an in-field traveling instructing section, a traveling route securing section, and a traveling permission section. The in-field traveling instructing section is configured to determine whether or not there is a blockade moving vehicle serving to hinder the traveling of the moving vehicle on a traveling route to an inspection field in a railyard based on different moving vehicle related data indicating data related to different moving vehicles in the railyard when the moving vehicle is in an inspection waiting state in the railyard. The traveling route securing section is configured to request securement of the traveling route to a railyard interface device that controls branching on the traveling route when there is not the blockade moving vehicle on the traveling route. The traveling permission section is configured to permit the traveling of the moving vehicle on the secured route based on traveling route state data indicating the traveling route securement from the railyard interface device.

The vehicle having the on-board device of the present invention having such a configuration can travel autonomously to the inspection field, when it is an inspection waiting vehicle in the railyard. Thus, the traveling work of the vehicle can be automated and the time for the traveling work can be reduced at a maximum. Also, the work load of the command staff for the traveling work of the vehicle can be reduced. Thus, it becomes possible to use the railyard efficiently.

In the above-mentioned on-board device, the in-field travel instructing section may output a traveling command to the blockade moving vehicle, when there is the blockade moving vehicle on the traveling route.

The vehicle having the on-board device of the present invention which has such a configuration can autonomously remove the blockade vehicle and autonomously travel to the inspection field, even if there is the blockade moving vehicle which hinders the traveling of the vehicle in the railyard.

In the above-mentioned on-board device, the control device may further include an in-field leading section configured to search a traveling destination in the railyard based on the different moving vehicle related data, when receiving the traveling command as the blockade moving vehicle from a different moving vehicle, and control the blockade moving vehicle to travel to the searched traveling destination.

The vehicle having the on-board device of the present invention which has such a configuration can autonomously find the traveling destination and autonomously travel to the traveling destination, even if it is the blockade moving vehicle which hinders the traveling in the railyard.

In the above-mentioned on-board device, the in-field leading section may determine whether or not the blockade moving vehicle is a head blockade moving vehicle, when recognizing that there are a plurality of the blockade moving vehicles, based on the different moving vehicle related data, search a movable traveling destination in the railyard, when being the head blockade moving vehicle, controlling the blockade moving vehicle to travel to the searched traveling destination, and travel to follow a neighbor blockade moving vehicle when being not the head blockade moving vehicle.

In the on-board device of the present invention which has such a configuration, even if there are a plurality of the blockade moving vehicles in the railyard, the head blockade moving vehicle finds the traveling destination autonomously, and the plurality of blockade moving vehicles can collectively travel to the traveling destination autonomously.

In the above-mentioned on-board device, the control device may further include a train state setting section configured to refer to an operation state of the moving vehicle stored in the moving vehicle to determine whether or not the operation state meets a predetermined inspection condition when the moving vehicle is in the on-line state in the railyard. When the moving vehicle meets the predetermined inspection condition, the train state setting section sets a train state to the inspection waiting state indicating that an inspection should be carried out.

The vehicle having the on-board device of the present invention which has such a configuration can autonomously determine whether or not it is an inspection waiting vehicle in the railyard. Thus, it is possible to receive the inspection autonomously according to need.

A signaling system of the present invention has a plurality of on-board devices, and a railyard interface device. The plurality of on-board devices are loaded in a plurality of moving vehicles traveling on a track, and each on-board device is described in any one of the above paragraphs. The railyard interface device arranged in the railyard to be communicable bi-directionally with the plurality of on-board devices and configured to control a plurality of branches in the railyard.

In the signaling system of the present invention which has such a configuration, the replacement work of the vehicles in the railyard can be automated and the time necessary for the replacement work can be reduced at a maximum. Thus, the influence of the replacement work of the vehicle on the operation of train can be reduced and the transportation capacity decline can be avoided. Also, the work load of the command staff about the traveling work of the vehicle can be reduced. Thus, it becomes possible to use the railyard efficiently.

A control method of a moving vehicle of the present invention is a control method of a moving vehicle traveling on a track. The control method of this moving vehicle includes: determining, by an on-board device of a moving vehicle, whether or not there is a blockade moving vehicle serving to hinder the traveling of the moving vehicle on a traveling route to an inspection field in a railyard based on different moving vehicle related data indicating data related to different moving vehicles in the railyard when the moving vehicle is in an inspection waiting state in the railyard; requesting, by the on-board device, securement of the traveling route to a railyard interface device that controls branching on the traveling route when there is not the blockade moving vehicle on the traveling route; and permitting, by the on-board device, the traveling of the moving vehicle on the secured route based on traveling route state data indicating the traveling route securement from the railyard interface device.

The control method of the moving vehicle which has such a configuration according to the present invention can travel autonomously to the inspection field, when it is an inspection waiting vehicle in the railyard. Thus, the traveling work of the vehicle can be automated and the time necessary for the traveling work can be reduced at a maximum. Also, the work load of the command staff about the traveling work of the vehicle can be reduced. Thus, it becomes possible to use the railyard efficiently.

In the above-mentioned control method of the moving vehicle, the determining whether or not there is the blockade moving vehicle includes: outputting, by the on-board device, a traveling command to the blockade moving vehicle, when there is the blockade moving vehicle on the traveling route.

The control method of the moving vehicle which has such a configuration according to the present invention can autonomously remove the blockade moving vehicle and autonomously move to the inspection field, even if there is the blockade moving vehicle which hinders the traveling in the railyard.

The above-mentioned control method of the moving vehicle may further include searching, by the on-board device, a traveling destination in the railyard based on the different moving vehicle related data, when receiving the traveling command as the blockade moving vehicle from a different moving vehicle; and controlling the blockade moving vehicle to travel to the searched traveling destination.

The control method of the moving vehicle which has such a configuration according to the present invention can autonomously find the traveling destination and autonomously travel to the traveling destination, even if it is the blockade moving vehicle in the railyard.

In the above-mentioned control method of the moving vehicle, the controlling the blockade moving vehicle to travel to a searched traveling destination may include: determining, by the on-board device, whether or not the moving vehicle is a head blockade moving vehicle, when recognizing that there are a plurality of the blockade moving vehicles, based on the different moving vehicle related data, searching, by the on-board device, a traveling destination in the railyard, when being the head blockade moving vehicle, controlling, by the on-board device, the blockade moving vehicle to travel to the searched traveling destination, and traveling to follow a neighbor blockade moving vehicle when being not the head blockade moving vehicle.

In the control method of the moving vehicle which has such a configuration according to the present invention, even if there are a plurality of the blockade moving vehicles in the railyard, the head vehicle autonomously finds the traveling destination, and the plurality of blockade moving vehicles can collectively travel to the traveling destination autonomously.

The above-mentioned control method of the moving vehicle may further include: referring to the operation state of the moving vehicle stored in the moving vehicle by the on-board device when the moving vehicle is in the on-line state in the railyard, and determining whether or not the operation state meets a predetermined inspection condition. The determining by the on-board device whether or not the operation state meets the predetermined inspection condition may include: setting a train state to the inspection waiting state showing that the inspection should be carried out, when the moving vehicle meets the predetermined inspection condition.

In the control method of the moving vehicle which has such a configuration according to the present invention, whether or not itself is an inspection waiting vehicle in the railyard can autonomously determine. Thus, the inspection can be autonomously received according to need.

A non-transitory storage medium stores a program, when being executed, to make a computer execute the control method of the moving vehicle described in any one of the above paragraphs.

The invention claimed is:

1. An on-board device loaded in a moving vehicle traveling on a track, comprising a control device configured to control the traveling of the moving vehicle, wherein the control device comprises:

an in-field traveling instructing section configured to determine whether or not there is a blockade moving vehicle serving to hinder the traveling of the moving vehicle on a traveling route to an inspection field in a railyard based on different moving vehicle related data indicating data related to different moving vehicles in the railyard when the moving vehicle is an inspection waiting vehicle in an on-line state in the railyard;

a traveling route securing section configured to request securement of the traveling route to a railyard interface device that controls branching on the traveling route when there is not the blockade moving vehicle on the traveling route; and a traveling permission section configured to permit the traveling of the moving vehicle on the secured traveling route based on traveling route state data indicating the traveling route securement from the railyard interface device, wherein, when there is the blockade moving vehicle on the traveling route, the in-field traveling instruction section gives priority to a traveling of the blockade moving vehicle if the blockade moving vehicle is an inspection waiting vehicle, and the in-field travel instructing section outputs a traveling command to the blockade moving vehicle if the blockade moving vehicle is not the inspection waiting vehicle, and wherein the traveling command makes the blockade moving vehicle travel.

2. The on-board device according to claim 1, wherein the control device further comprises:

an in-field leading section configured to search a traveling destination in the railyard based on the different moving vehicle related data, when receiving the traveling command as the blockade moving vehicle from a different moving vehicle, and controls the moving vehicle to travel to the searched traveling destination.

3. The on-board device according to claim 2, wherein the in-field leading section:

determines whether or not the moving vehicle is a head blockade moving vehicle, when recognizing that there are a plurality of the blockade moving vehicles based on the different moving vehicle related data, searches the traveling destination in the railyard, when being the head blockade moving vehicle, controls the head blockade moving vehicle to travel to the searched traveling destination, and travels to follow a neighbor blockade moving vehicle when being not the head blockade moving vehicle.

4. The on-board device according to claim 1, wherein the control device further comprises:

a train state setting section configured to refer to an operation state of the moving vehicle stored in the moving vehicle to determine whether or not the operation state meets a predetermined inspection condition, when the moving vehicle is in the on-line state in the railyard, and wherein, when the moving vehicle meets the predetermined inspection condition, the train state setting section sets a train state to the inspection waiting state indicating that inspection should be carried out.

5. The on-board device according to claim 1, wherein the blockage moving vehicle comprises the on-board device, and wherein the on-board device further comprises a train state setting section configured to determine whether or not the moving vehicle is the inspection waiting vehicle based on a traveling time of the moving vehicle since previous inspection date.

6. The on-board device according to claim 5, wherein the train state setting section determines that the moving vehicle is the inspection waiting vehicle, when the traveling time is longer than a predetermined time.

7. The on-board device according to claim 1, wherein when there is the blockade moving vehicle on the traveling route, the in-field travel instructing section waits for the blockade moving vehicle to travel if the blockade moving vehicle is an inspection waiting vehicle.

8. A signaling system comprising:

a plurality of on-board devices, each of which is loaded in one of a plurality of moving vehicles traveling on a track and which comprises a control device configured to control the traveling of the moving vehicle, wherein the control device comprises:

an in-field traveling instructing section configured to determine whether or not there is a blockade moving vehicle serving to hinder the traveling of the moving vehicle on a traveling route to an inspection field in a railyard based on different moving vehicle related data indicating data related to different moving vehicles in the railyard when the moving vehicle is an inspection waiting vehicle in an on-line state in the railyard, a traveling route securing section configured to request securement of the traveling route to a railyard interface device that controls branching on the traveling route when there is not the blockade moving vehicle on the traveling route, and a transmitting permission section configured to permit the traveling of the moving vehicle on the secured traveling route based on traveling route state data indicating the traveling route securement from the railyard interface device; and a railyard interface device arranged in the railyard for the plurality of on-board devices to be communicable bi-directionally with the plurality of on-board devices and configured to control a plurality of branches in the railyard, wherein, when there is the blockade moving vehicle on the traveling route, the in-field traveling instruction section gives priority to a traveling of the blockade moving vehicle if the blockade moving vehicle is an inspection waiting vehicle, and the in-field travel instructing section outputs a traveling command to the blockade moving vehicle if the blockade moving vehicle is not an inspection waiting vehicle, and wherein the traveling route makes the blockade moving vehicle travel.

9. A control method of a moving vehicle traveling on a track, comprising:

determining, by an on-board device of a moving vehicle, whether or not there is a blockade moving vehicle serving to hinder the traveling of the moving vehicle on a traveling route to an inspection field in a railyard based on different moving vehicle related data indicating data related to different moving vehicles in the railyard when the moving vehicle is an inspection waiting vehicle in an on-line state in the railyard;

requesting, by the on-board device, securement of the traveling route to a railyard interface device that controls branching on the traveling route when there is not the blockade moving vehicle on the traveling route; and permitting, by the on-board device, the moving vehicle to travel on the secured traveling route based on traveling route state data indicating the traveling route securement from the railyard interface device, wherein the determining whether or not there is the blockade moving vehicle comprises:

outputting, by the on-board device, a traveling command to the blockade moving vehicle if the blockade moving vehicle is not an inspection waiting vehicle, when there is the blockade moving vehicle on the traveling route; and giving priority to a traveling of the blockade moving vehicle if the blockade moving vehicle is an inspection waiting vehicle, when there is the blockade moving vehicle on the traveling route, wherein the traveling command makes the blockade moving vehicle travel.

10. The control method of the moving vehicle according to claim 9, further comprising:

searching, by the on-board device, a traveling destination in the railyard based on the different moving vehicle related data, when receiving the traveling command as the blockade moving vehicle from a different moving vehicle; and controlling the blockade moving vehicle to travel to the searched traveling destination.

11. The control method of the moving vehicle according to claim 10, wherein the controlling the blockade moving vehicle to travel to the searched traveling destination comprises:

determining, by the on-board device, whether or not the blockade moving vehicle is a head blockade moving vehicle, when recognizing that there are a plurality of the blockade moving vehicles, based on the different moving vehicle related data;

searching, by the on-board device, a traveling destination in the railyard, when being the head blockade moving vehicle;

controlling, by the on-board device, the blockade moving vehicle to travel to the searched traveling destination, and traveling to follow a neighbor blockade moving vehicle when being not the head blockade moving vehicle.

12. The control method of the moving vehicle according to claim 9, further comprising:

referring to the operation state of the moving vehicle stored in the moving vehicle by the on-board device when the moving vehicle is in the on-line state in the railyard, and determining whether or not the operation state meets a predetermined inspection condition, and wherein the determining whether or not the operation state meets the predetermined inspection condition comprises:

setting a train state to the inspection waiting state showing that the inspection should be carried out, when the moving vehicle meets the predetermined inspection condition.

13. A non-transitory storage medium which stores a program, when being executed, to make a computer execute the control method of the moving vehicle traveling on a track, which comprises:

determining, by an on-board device of a moving vehicle, whether or not there is a blockade moving vehicle serving to hinder the traveling of the moving vehicle on a traveling route to an inspection field in a railyard based on different moving vehicle related data indicating data related to different moving vehicles in the railyard when the moving vehicle is an inspection waiting vehicle in an on-line state in the railyard;

requesting, by the on-board device, securement of the traveling route to a railyard interface device that controls branching on the traveling route when there is not the blockade moving vehicle on the traveling route; and permitting, by the on-board device, the moving vehicle to travel on the secured traveling route based on traveling route state data indicating the traveling route securement from the railyard interface device, wherein, when there is the blockade moving vehicle on the traveling route, the in-field traveling instruction section gives priority to a traveling of the blockade moving vehicle if the blockade moving vehicle is an inspection waiting vehicle, and the in-field travel instructing section outputs a traveling command to the blockade moving vehicle if the blockade moving vehicle is not an inspection waiting vehicle, and wherein the traveling command makes the blockade moving vehicle travel.

* * * * *